US011537865B2

(12) United States Patent
Nair et al.

(10) Patent No.: US 11,537,865 B2
(45) Date of Patent: Dec. 27, 2022

(54) MAPPING CONVOLUTION TO A CHANNEL CONVOLUTION ENGINE

(71) Applicant: Meta Platforms, Inc., Menlo Park, CA (US)

(72) Inventors: Krishnakumar Narayanan Nair, Newark, CA (US); Rakesh Komuravelli, Fremont, CA (US); Abdulkadir Utku Diril, Menlo Park, CA (US); Ehsan Khish Ardestani Zadeh, San Jose, CA (US); Yuchen Hao, Fremont, CA (US); Martin Schatz, Seattle, WA (US); Thomas Mark Ulrich, Mountain View, CA (US); Olivia Wu, Los Altos, CA (US); Anup Ramesh Kadkol, Sunnyvale, CA (US); Amin Firoozshahian, Mountain View, CA (US)

(73) Assignee: Meta Platforms, Inc., Menlo Park, CA (US)

(*) Notice: Subject to any disclaimer, the term of this patent is extended or adjusted under 35 U.S.C. 154(b) by 414 days.

(21) Appl. No.: 16/793,961

(22) Filed: Feb. 18, 2020

(65) Prior Publication Data
US 2021/0256363 A1    Aug. 19, 2021

(51) Int. Cl.
*G06N 3/063* (2006.01)
*G06N 3/08* (2006.01)
(Continued)

(52) U.S. Cl.
CPC ....... *G06N 3/0635* (2013.01); *G06F 9/30036* (2013.01); *G06F 9/30098* (2013.01); *G06F 17/16* (2013.01); *G06N 3/08* (2013.01)

(58) Field of Classification Search
CPC ...... G06N 3/0635; G06N 3/08; G06N 3/0454; G06N 3/063; G06F 9/30036;
(Continued)

(56) References Cited

U.S. PATENT DOCUMENTS

| 2002/0007484 A1* | 1/2002 | Tirumalai | ............. G06F 8/4441 |
| | | | 717/160 |
| 2016/0179540 A1* | 6/2016 | Smelyanskiy | ...... G06F 9/30145 |
| | | | 712/213 |

(Continued)

FOREIGN PATENT DOCUMENTS

CN    110705687    1/2020

OTHER PUBLICATIONS

European Search Report for European Application No. 21153047.2, dated Dec. 1, 2021, 7 pages.

*Primary Examiner* — Farley Abad
(74) *Attorney, Agent, or Firm* — Van Pelt, Yi & James LLP

(57) ABSTRACT

A processor system comprises a first and second group of registers and a hardware channel convolution processor unit. The first group of registers is configured to store data elements of channels of a portion of a convolution data matrix. Each register stores at least one data element from each channel. The second group of registers is configured to store data elements of convolution weight matrices including a separate convolution weight matrix for each channel. Each register stores at least one data element from each convolution weight matrix. The hardware channel convolution processor unit is configured to multiply each data element in the first group of registers with a corresponding data element in the second group of registers and sum together the multiplication results for each specific channel to determine corresponding channel convolution result data
(Continued)

elements in a corresponding channel convolution result matrix.

20 Claims, 17 Drawing Sheets

(51) Int. Cl.
*G06F 17/16* (2006.01)
*G06F 9/30* (2018.01)

(58) Field of Classification Search
CPC .... G06F 9/30098; G06F 17/16; G06F 9/3001; G06F 17/153; G06F 9/3013
See application file for complete search history.

(56) References Cited

U.S. PATENT DOCUMENTS

| | | | |
|---|---|---|---|
| 2018/0341495 A1* | 11/2018 | Culurciello | G06N 3/08 |
| 2019/0392287 A1* | 12/2019 | Ovsiannikov | G06N 3/08 |
| 2020/0034148 A1 | 1/2020 | Sumbul et al. | |
| 2020/0090030 A1* | 3/2020 | Huang | G06N 3/0454 |
| 2020/0218978 A1* | 7/2020 | Kopinsky | G06F 17/16 |

* cited by examiner

FIG. 13

| $X_{1,7}$ | $X_{2,7}$ | $X_{3,7}$ | $X_{4,7}$ | $X_{5,7}$ | $X_{6,7}$ | $X_{7,7}$ |
| $X_{1,6}$ | $X_{2,6}$ | $X_{3,6}$ | $X_{4,6}$ | $X_{5,6}$ | $X_{6,6}$ | $X_{7,6}$ |
| $X_{1,5}$ | $X_{2,5}$ | $X_{3,5}$ | $X_{4,5}$ | $X_{5,5}$ | $X_{6,5}$ | $X_{7,5}$ |
| $X_{1,4}$ | $X_{2,4}$ | $X_{3,4}$ | $X_{4,4}$ | $X_{5,4}$ | $X_{6,4}$ | $X_{7,4}$ |
| $X_{1,3}$ | $X_{2,3}$ | $X_{3,3}$ | $X_{4,3}$ | $X_{5,3}$ | $X_{6,3}$ | $X_{7,3}$ |
| $X_{1,2}$ | $X_{2,2}$ | $X_{3,2}$ | $X_{4,2}$ | $X_{5,2}$ | $X_{6,2}$ | $X_{7,2}$ |
| $X_{1,1}$ | $X_{2,1}$ | $X_{3,1}$ | $X_{4,1}$ | $X_{5,1}$ | $X_{6,1}$ | $X_{7,1}$ |

1300, 1301

US 11,537,865 B2

MAPPING CONVOLUTION TO A CHANNEL CONVOLUTION ENGINE

BACKGROUND OF THE INVENTION

A whole class of complex artificial intelligence problems can be solved using neural networks. Since these problems are often computationally and data intensive, hardware solutions are often beneficial for improving the performance of neural networks. The solutions to artificial intelligence problems can often be more quickly solved using hardware-based solutions that optimize the performance of convolution operations and in particular depthwise convolution operations. Traditional optimization approaches for depthwise convolution require specialized hardware and complex memory organization schemes. It is a technical challenge to create a hardware platform compatible with solving different matrix operations while also significantly improving the performance and efficiency for solving convolution operations. Therefore, there exists a need for a hardware and data path solution that improves on the ability to efficiently compute convolution operations needed for solving complex artificial intelligence problems without introducing significant complexity and restrictions.

BRIEF DESCRIPTION OF THE DRAWINGS

Various embodiments of the invention are disclosed in the following detailed description and the accompanying drawings.

FIG. 13 is a diagram illustrating a single channel of an example activation data input matrix traversed horizontally for performing a channel convolution operation.

DETAILED DESCRIPTION

Figure 1:
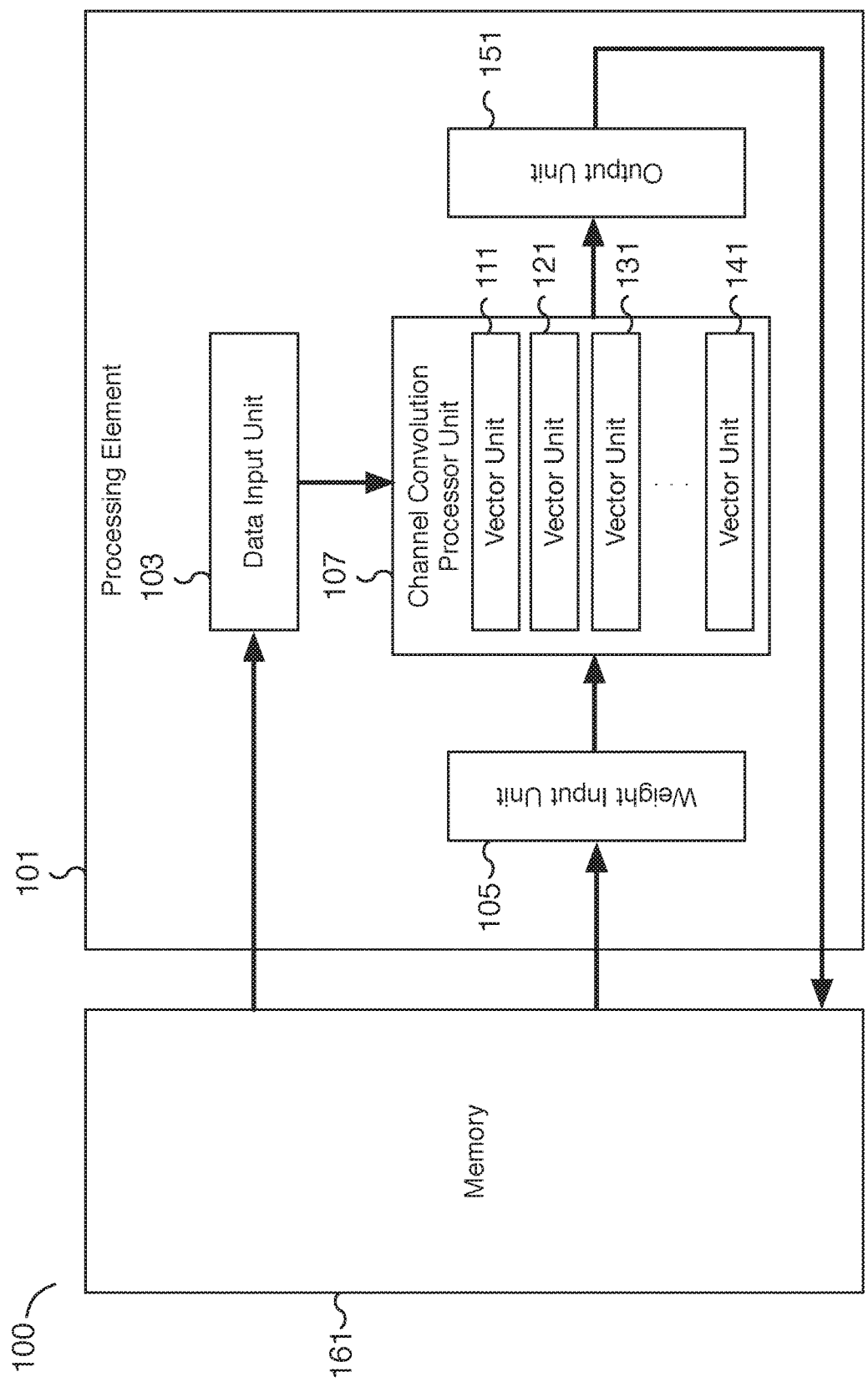
FIG. 1 is a block diagram illustrating an embodiment of a system for solving artificial intelligence problems using a neural network.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A processor system for performing efficient convolution operations using a channel convolution processor is disclosed. Using the disclosed techniques, the throughput and power efficiency for computing convolution operations and in particular depthwise convolutions is significantly increased particularly for input activation data with small width and height dimensions. In some embodiments, the processor system includes a channel convolution processor unit capable of performing convolution operations using two input matrices by applying different weight matrices to different channels of portions of a data convolution matrix. The channel convolution processor unit includes a plurality of calculation units such as vector units used to process input vectors of the input matrices. In various embodiments, a calculation unit includes at least a vector multiply unit and a vector adder unit. The vector multiply unit is capable of performing multiply operations using corresponding elements of two input vectors, data elements from the same channel and weight input elements from a weight matrix. In some embodiments, the vector adder unit is used to sum the vector of multiplication results computed using a vector multiply unit. For example, the vector adder unit can be used to compute the dot product result of two vectors using the vector multiplication results of vector elements from corresponding input vectors. In some embodiments, the vector adder unit is an adder tree. For example, an adder tree computes the sum of the multiplication results by summing multiplication results and subsequent partial sums in parallel.

In some embodiments, a processor system includes a data input unit and a weight input unit for preparing vector operands for the channel convolution processor. The data input unit loads a portion of a data convolution matrix such as a 3×3×32 portion of a larger three-dimensional (height× width×channel) matrix. For example, for each vector register of the data input unit, a portion of the data convolution matrix is loaded corresponding to different channels. The number of vector registers to load can correspond to the number of elements in a weight matrix. For example, using a plurality of 3×3 weight matrices, the data input unit prepares nine vector registers, each holding data elements corresponding to multiple channels, such as 32 or another appropriate number of channels. In some embodiments, the number of channels loaded is based on a cache line size and can match the vector register size. The corresponding elements at each similar depth of each vector register are elements of a sub-matrix of the data convolution matrix for a single channel.

In some embodiments, a weight input unit prepares a number of weight matrices for the channel convolution processor. The number of weight matrices prepared corresponds to the number of channels loaded for each vector register of the data input unit. For example, 32 weight matrices may be loaded using nine vector registers of the weight input unit to correspond to loading a 3×3×32 portion of a data convolution matrix. Once the vector registers of the data input unit and weight input unit are loaded with activation and weight data, the corresponding elements of the vector registers are loaded into vector units of a channel convolution processor unit. The data input elements of the same channel and a corresponding weight matrix are loaded to the same vector unit. Each vector unit calculates a dot product result by multiplying corresponding data input and weight input elements and summing together the multiplication results to determine one channel convolution result data element. The channel convolution result data elements of each vector unit are combined to determine a corresponding portion of a channel convolution result matrix, such as a 1×1×32 portion of a channel convolution result matrix for each 3×3×32 portion of the data convolution matrix.

In various embodiments, once corresponding convolution results for a portion of the data convolution matrix are determined, the next portion of the data convolution matrix is processed. For example, an additional vertical (or horizontal) slice of the data convolution matrix is loaded by the data input unit and used with a portion of the data from the previous portion of the data convolution matrix. In various embodiments, successive iterations can reuse portions of the data convolution matrix used from the previous iteration and need only a new slice of additional data elements. For example, the next 3×3×32 portion of a data convolution matrix only requires loading a 1×3×32 slice of the data convolution matrix corresponding to a vertical slice to combine with a 2×3×32 portion from the previous iteration. Similarly, a 3×1×32 slice of the data convolution matrix corresponding to a horizontal slice can be combined with a 3×2×32 portion from a previous iteration. The data elements from the previous iteration that overlap with the data elements from the current iteration are reused to minimize reloading of duplicative data. In various embodiments, the weight input data is reused across iterations resulting in significant performance efficiency.

In some embodiments, a depthwise convolution on a large activation input data matrix can be distributed across multiple processing elements, with each processing element having its own data input unit, weight input unit, and channel convolution processor. Portions for the activation data can be assigned to different processing elements to each perform a portion of the depthwise convolution operation. The applicable weights can be broadcasted to all applicable processing elements. The results of the different processing elements are merged to determine the channel convolution result matrix in parallel. In various embodiments, the layout of the activation input data matrix, weight data matrix, and channel convolution result matrix use a channel-first layout format that increases memory and processing efficiency. For example, input arguments and output arguments for the convolution processor unit are in the same format as stored in memory and do not require complex processor and memory bandwidth intensive operations such as layout transformation operations. Utilizing a channel convolution processor for depthwise operations results in significant performance and efficiency improvements.

In some embodiments, a processor system comprises a first group of registers, a second group of registers, and a channel convolution processor unit. For example, a processing element includes a data input unit with a first group of vector registers and a weight input unit with a second group of vector registers. The first group of registers is configured to store data elements of a plurality of channels of a portion of a convolution data matrix, wherein each register of the first group of registers stores at least one data element from each of the plurality of channels. In some embodiments, the convolution data matrix is a three-dimensional matrix, such as a three-dimensional machine learning matrix, with width, height, and channel dimensions. For example, in some embodiments, each register of the first group is a vector register that stores a vector of data elements, each data element corresponding to a different channel of the convolution data matrix, such as channels 1 through 32 for a 32-element vector register. In various embodiments, each register of the first group of registers can further correspond to a different width and height location of the convolution data matrix. The second group of registers is configured to store data elements of a plurality of convolution weight matrices including a separate convolution weight matrix for each of the plurality of channels, wherein each register of the second group of registers stores at least one data element from each of the plurality of convolution weight matrices. In some embodiments, each weight matrix is a two-dimensional matrix with width and height dimensions and there may be as many weight matrices as there are channels of the convolution data matrix. For example, in some embodiments, each register of the second group is a vector register that stores a vector of weight data elements, each weight data element corresponding to a different convolution weight matrix. A 32-element vector register can store weight data elements from 32 different convolution weight matrices, each of the weight matrices corresponding to a different channel of the convolution data matrix. In various embodiments, each register of the second group of registers corresponds to a different width and height location of the corresponding convolution weight matrices. In various embodiments, the total count of the stored data elements of the first group of registers is the same as a total count of the stored data elements of the second group of registers. For example, the number of data elements stored from the convolution data matrix equals the number of weight data elements stored from the plurality of convolution weight matrices.

In some embodiments, the channel convolution processor unit is configured to, for each data element in the first group of registers, multiply the data element in the first group of registers with a corresponding data element in the second group of registers. For example, each data element associated with the convolution data matrix is multiplied with a corresponding weight data element of the convolution weight matrix. The channel convolution processor unit is configured to, for each specific channel of the plurality of channels, sum together ones of the multiplication results corresponding to the specific channel to determine one corresponding channel convolution result data element in a corresponding channel convolution result matrix. For example, multiplication results of the same channel are summed together to determine a corresponding channel convolution result data element. Each sum of the multiplication results corresponds to applying a convolution weight matrix to a single channel and subset of data elements of the convolution data matrix. In some embodiments, each sum of the multiplication results corresponds to at least a partial dot product result for a channel of the convolution data matrix.

FIG. 1 is a block diagram illustrating an embodiment of a system for solving artificial intelligence problems using a neural network. In the example shown, system 100 includes processing element 101 and memory 161. Processing element 101 includes data input unit 103, weight input unit 105, channel convolution processor unit 107, and output unit 151. In some embodiments, processing element 101 is a hardware integrated circuit, for example, an application specific integrated circuit (ASIC) and includes hardware components data input unit 103, weight input unit 105, channel convolution processor unit 107, and output unit 151. As compared to a general purpose processor, processing element 101 is designed and implemented using a specialized hardware integrated circuit to more efficiently perform one or more specific computing tasks related to performing convolution operations and/or solving artificial intelligence problems using a neural network. The specialized hardware results in significant performance improvements and resource efficiencies gained over using a general purpose processor. In the example shown, channel convolution processor unit 107 includes multiple vector calculation units including at least vector units 111, 121, 131, and 141. In various embodiments, channel convolution processor unit 107 receives data input vectors (not shown) from data input unit 103 and weight input vectors (not shown) from weight input unit 105. For example, in some embodiments, data input vectors are generated by data input unit 103 that correspond to 2D sub-matrices of a 3D activation data input matrix, where each 2D sub-matrix corresponds to a different channel of the 3D activation data input matrix. Weight input vectors are generated by weight input unit 105 and correspond to different weight matrices. In various embodiments, the 2D sub-matrices of the 3D activation data input matrix and the weight matrices may be 3×3 matrices or another appropriate size. The data elements of the activation data input matrix and the weight input matrices may be stored and retrieved from memory 161.

In some embodiments, each generated data input vector and weight input vector pair may be passed as arguments to a vector calculation unit, such as one of vector units 111, 121, 131, and 141, of channel convolution processor unit 107. For example, a vector unit of channel convolution processor unit 107 may determine a channel convolution result data element, such as a dot product result, using a data input vector and weight input vector pair. In some embodiments, channel convolution processor unit 107 includes 32 vector units and/or another appropriate number of vector units. The number of vector units may be based on the cache line size, for example, the cache line size or a multiple of the cache line size. For example, the cache line multiple can be one and the number of vector units may be equal to the cache line size. Each vector unit may take data elements corresponding to two vectors as arguments and can each produce a single element result. Using 3×3 matrices as an example, each vector unit takes two 9-element vectors as arguments, one vector corresponding to a sub-matrix of the activation data input matrix and one vector corresponding to a weight matrix. Taken across all vector units of channel convolution processor unit 107, the results are an output vector result and correspond to data elements of a channel convolution result matrix. Over additional iterations, different portions of the activation data input matrix are processed using the same weight matrices by channel convolution processor unit 107 to determine additional data elements of the channel convolution result matrix. In various embodiments, the output of channel convolution processor unit 107 for each iteration can be an output vector and is received at output unit 151. In some embodiments, the output vector received at output unit 151 is a 32-element vector. Although 32 channels are processed using 3×3 matrices for each iteration in the example above, the size of the elements and matrices processed by system 100 can be configured as appropriate. For example, elements may be 4-bits, 8-bits, 2-byte, 4-bytes, or another appropriate size. Similarly, the sub-matrices of the activation data input matrix and weight matrices can be 3×3, 5×5, or another appropriate size.

In some embodiments, channel convolution processor unit 107 is configured to receive multiple pairs of input matrices. Each pair of input matrices includes a data input matrix and a corresponding weight matrix. Each data input matrix corresponds to a particular channel of a portion of an activation data input matrix and is processed by data input unit 103. Each weight input matrix corresponds to the weight matrix to be applied to the channel and is processed by weight input unit 105. Data input unit 103, weight input unit 105, and output unit 151 may be implemented using hardware registers, such as flip-flop circuits, for transferring multiple input and output elements to/from channel convolution processor unit 107. In some embodiments, elements corresponding to each data input vector are retrieved from memory 161 and loaded into a corresponding vector unit, such as vector units 111, 121, 131, or 141, of channel convolution processor unit 107 via data input unit 103. For example, a channel convolution processor unit with 32 vector units can be loaded with 32 vectors of data input elements corresponding to 32 different channels of an activation data input matrix via data input unit 103. Similarly, elements corresponding to each weight input vector are retrieved from memory 161 and loaded into a corresponding vector unit, such as vector units 111, 121, 131, or 141, of channel convolution processor unit 107 via weight input unit 105. For example, a channel convolution processor unit with 32 vector units can be loaded with 32 vectors of weight input elements corresponding to 32 different weight matrices via weight input unit 105. As results corresponding to portions of the activation data input matrix are determined, additional data elements are loaded for processing additional portions of the activation data input matrix with the same weight matrices. For example, data input unit 103 loads additional needed data elements and generates new data input vectors corresponding to the new portion of the activation data input matrix for determining additional channel convolution results. As the data input vectors change to correspond to new portions of the activation data input matrix, the weight input vectors can remain the same and can be reused, significantly improving the efficiency of convolution operations. In various embodiments, the thick arrows of FIG. 1 represent the direction data moves through the components of system 100. For example, the arrows may correspond to multi-element wide communication/data buses and/or data lines. In various embodiments, an output vector result received at output unit 151 can be written back to memory 161.

In various embodiments, each vector unit of channel convolution processor unit 107, such as vector units 111, 121, 131, or 141, receives two vector operands and can perform one or more vector operations. For example, a vector unit can compute the dot product of the two input operands and output the result as one element of an output vector to output unit 151. In various embodiments, the output result of a vector unit corresponds to a channel convolution result data element of a corresponding channel convolution result matrix. In some embodiments, each vector unit of channel convolution processor unit 107, such as vector units 111, 121, 131, or 141, includes both a multiply unit and an adder unit (not shown).

In some embodiments, multiple instances of processing element 101 can operate in parallel to process different portions of an activation data input matrix. For example, each processing element can retrieve its assigned data elements of the activation data input matrix and corresponding weight matrices from memory 161. In some embodiments, different processing elements share weight matrices and the data elements of the shared weight matrices can be broadcasted to the appropriate processing elements to improve memory efficiency. Each processing element performs depthwise convolution operations on the assigned portions of the activation data input matrix using its own channel convolution processor unit. The results of each processing element can be combined, for example, by writing the results to a shared memory location such as memory 161. In some embodiments, channel convolution processor unit 107 includes the functionality of data input unit 103, weight input unit 105, and/or output unit 151.

Figure 2:
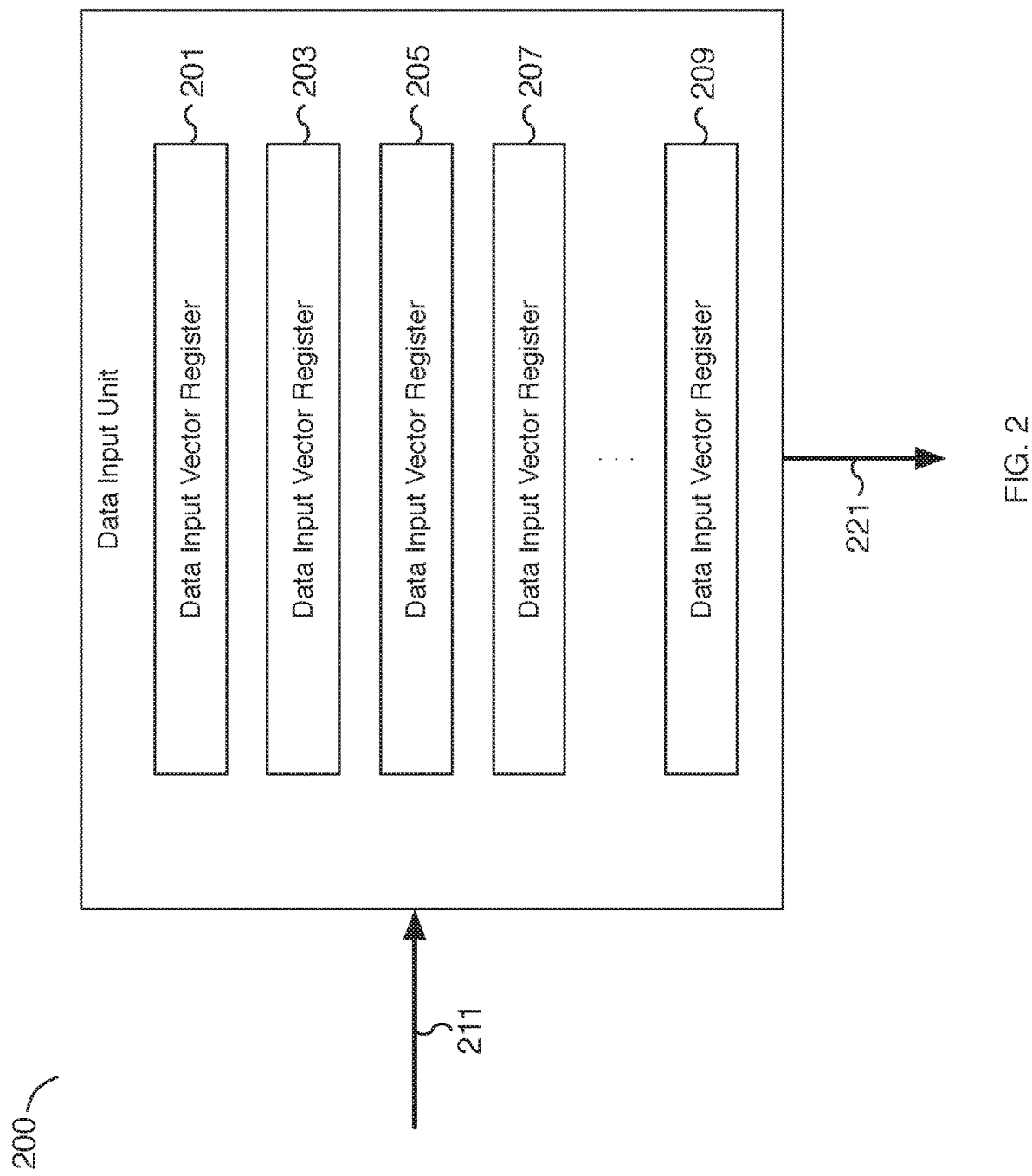
FIG. 2 is a block diagram illustrating an embodiment of a data input unit for preparing data input matrices for a channel convolution processor.

FIG. 2 is a block diagram illustrating an embodiment of a data input unit for preparing data input matrices for a channel convolution processor. Data input unit 200 includes multiple data input vector registers such as data input vector registers 201, 203, 205, 207, and 209. Data input unit 200 receives input data via connection 211 and writes output data as convolution matrix arguments via connection 221. In some embodiments, connections 211 and/or 221 are multi-element wide communication/data buses and/or data lines. In some embodiments, connection 211 communicatively connects data input unit 200 to memory such as memory 161 of FIG. 1 and connection 221 communicatively connects data input unit 200 to a channel convolution processor unit such as channel convolution processor unit 107 of FIG. 1.

For example, data elements may be retrieved from memory via connection 211, processed by data input unit 200 into appropriate convolution matrix arguments arranged by channel, and passed to a channel convolution processor unit as convolution matrix arguments via connection 221. In some embodiments, the convolution matrix arguments are passed as data input vectors, where each data input vector corresponds to a particular channel of a portion of an activation data input matrix.

In some embodiments, the number of data input vector registers of data input unit 200 corresponds to the size of the corresponding weight matrices used for performing depthwise convolution. For example, a 3×3 weight matrix has nine weight elements and corresponds to nine activation data input elements of a 3×3 sub-matrix of an activation data input matrix. In various embodiments, one data input vector exists corresponding to each element of a convolution matrix argument. When applying 3×3 weight matrices, at least nine data input vector registers are utilized. Each data input vector register corresponds to one of the data elements of a 3×3 portion of an activation data input matrix. The length of each data input vector register corresponds to the number of channels that can be processed in parallel. In some embodiments, the number of channels processed in parallel corresponds to the cache line size or a multiple of the cache line size. For example, a 32-element cache line and a 32-element data input vector register allows an entire cache line to be read into a single data input vector register, such as data input vector registers 201, 203, 205, 207, or 209.

In the example shown, each data input vector register, such as data input vector registers 201, 203, 205, 207, and 209, stores data elements from different channels. For example, 32 different data elements corresponding to 32 different channels of an activation data input matrix are stored in each data input vector register of data input unit 200. Using the data input vector registers, data input unit 200 prepares convolution matrix arguments for a channel convolution processor unit. A data element from each data input vector register is identified based on the channel. For example, the first element of each data input vector register is identified and, in this example, corresponds to the first channel of an activation data input matrix. Using a 3×3 matrix example, nine data elements are identified and correspond to a 3×3 matrix from channel 1. The group of second data elements of each data input vector register corresponds to a 3×3 matrix from channel 2. The group of third data elements of each data input vector register corresponds to a 3×3 matrix from channel 3, and so forth. Although the example uses an initial offset of channel 1, the first element can correspond to another channel as appropriate and may be based on the cache line size. For example, the first element of each data input vector register may correspond to channel 1, 33, 65, or another appropriate channel. In various embodiments, the group of data elements from the same index in the data input vector registers together form a data input vector. For 32-element data input vector registers, 32 groups of data elements correspond to 32 different data input vectors, each associated with a different channel of an activation data input matrix. In some embodiments, data input unit 200 includes additional vector registers (not shown) for storing the data input vectors as arranged by channel. Data input unit 200 passes the prepared data input vectors to a channel convolution processor via connection 221. In various embodiments, at the channel convolution processor, the different data input vectors are loaded into different vector units with corresponding weight input vectors for performing a convolution operation.

In some embodiments, data input unit 200 is data input unit 103 of FIG. 1 and the channel convolution processor unit connected to data input unit 200 via connection 221 is channel convolution processor unit 107 of FIG. 1. In various embodiments, the data vector inputs prepared by data input unit 200 for the channel convolution processor unit are directed to a vector unit of the channel convolution processor such as vector units 111, 121, 131, or 141 of FIG. 1. Although 3×3 matrices are used in the example above, a different matrix size can be appropriate and data input unit 200 can be configured to process the different matrix size by utilizing an appropriate number of data input vector registers. For example, twenty-five data input vector registers can be utilized to process and prepare convolution matrix arguments with 5×5 matrices.

In some embodiments, data input unit 200 loads only the additional data elements of an activation data input matrix when processing subsequent portions of the activation data input matrix. For example, after an initial portion of an activation data input matrix is processed, only a subset of the next portion is needed. Existing portions stored in a subset of the data input vector registers can be used. For example, in some embodiments, a 3×3×32 initial portion is first loaded into nine 32-element data input vector registers of data input unit 200. Subsequent iterations only require loading a 1×3×32 portion of the activation data input matrix when traversing horizontally to process the next portion of the activation data input matrix. The new portion requires only loading three new data input vector registers. The data elements from six of the data input vector registers can be reused. For example, data input vector registers corresponding to the second columns of the convolution matrices from the previous iteration are now used to prepare the first columns of the new convolution matrices. Similarly, data input vector registers corresponding to the third columns of the convolution matrices from the previous iteration are now used to prepare the second columns of the new convolution matrices. The three newly loaded data input vector registers are used to prepare the third column of the new convolution matrices. In some embodiments, one or more multiplexers are used to select the correct data elements and/or data input vector registers for preparing the convolution matrices. In some embodiments, the new additional data is a 3×1×32 portion of the activation data input matrix when traversing vertically to process the next portion of the activation data input matrix.

Figure 3:
FIG. 3 is a block diagram illustrating an embodiment of a weight input unit for preparing weight input matrices for a channel convolution processor.

FIG. 3 is a block diagram illustrating an embodiment of a weight input unit for preparing weight input matrices for a channel convolution processor. Weight input unit 300 includes multiple weight input vector registers such as weight input vector registers 301, 303, 305, 307, and 309. Weight input unit 300 receives weight input data via connection 311 and writes output weight data as convolution matrix arguments via connection 321. In some embodiments, connections 311 and/or 321 are multi-element wide communication/data buses and/or data lines. In some embodiments, connection 311 communicatively connects weight input unit 300 to memory such as memory 161 of FIG. 1 and connection 321 communicatively connects weight input unit 300 to a channel convolution processor unit such as channel convolution processor unit 107 of FIG. 1. For example, weight data elements may be retrieved from memory via connection 311, processed by weight input unit 300 into appropriate convolution matrix arguments arranged by weight filters, and passed to a channel convolution processor unit as convolution matrix arguments via connection 321. In some embodiments, the convolution matrix arguments are passed as weight input vectors, where each weight input vector corresponds to a particular weight filter matrix associated with a particular channel of a portion of an activation data input matrix.

In some embodiments, the number of weight input vector registers of weight input unit 300 corresponds to the size of the corresponding weight matrices used for performing depthwise convolution. For example, a 3×3 weight matrix has nine weight elements and each weight element can be stored in a different weight input vector register. The nine weight elements for each weight matrix correspond to nine weight input vector registers. As another example, a 5×5 weight matrix has twenty-five weight elements and each weight element can be stored in a different one of twenty-five different weight input vector registers. In various embodiments, weight input unit 300 can be configured with a corresponding number of weight input vector registers for other weight matrix sizes as appropriate.

In some embodiments, the length of each weight input vector register corresponds to the number of weight matrices that can be processed in parallel with corresponding channels of an activation data input matrix. In some embodiments, a weight matrix exists for every channel of the activation data input matrix, which can far exceed the length of a weight input vector register. The number of weight matrices that are processed in parallel and the corresponding number of channels processed in parallel may be based on the cache line size or a multiple of the cache line size. For example, a 32-element cache line and a 32-element weight input vector register allows an entire cache line of weight data elements from different weight matrices to be read into a single weight input vector register, such as weight input vector registers 301, 303, 305, 307, or 309. In various embodiments, the weight matrices are stored in a channel-first layout format that allows for very efficient memory access when loading cache-line sized weight input data.

In the example shown, each weight input vector register, such as weight input vector registers 301, 303, 305, 307, and 309, stores weight data elements from different weight matrices. For example, 32 different weight data elements corresponding to 32 different weight matrices are stored in each weight input vector register of weight input unit 300. Using the weight input vector registers, weight input unit 300 prepares convolution matrix arguments for a channel convolution processor unit. A weight data element from each weight input vector register is identified based on the corresponding channel of the activation data input matrix. For example, the first element of each weight input vector register is identified and, in this example, corresponds to the weight matrix for the first channel of an activation data input matrix. Using a 3×3 matrix example, nine weight data elements are identified and correspond to a 3×3 weight matrix associated with channel 1. The group of second data elements of each weight input vector register corresponds to a 3×3 weight matrix associated with channel 2. The group of third weight data elements of each weight input vector register corresponds to a 3×3 weight matrix associated with channel 3, and so forth. Although the example associates the initial offset of each weight input vector register with channel 1, the first element can be associated with another channel of the activation data input matrix as appropriate and may be based on the cache line size. For example, the first element of each weight input vector register may correspond to channel 1, 33, 65, or another appropriate channel. In various embodiments, the group of weight data elements from the same index in the weight input vector registers together form a weight input vector. For 32-element weight input vector registers, 32 groups of weight data elements correspond to 32 different weight input vectors, each a different weight matrix and associated with a different channel of an activation data input matrix. In some embodiments, weight input unit 300 includes additional vector registers (not shown) for storing the weight input vectors once arranged as weight matrices and associated by channel. Weight input unit 300 passes the prepared weight input vectors to a channel convolution processor via connection 321. In various embodiments, at the channel convolution processor, the different weight input vectors are loaded into different vector units with corresponding data input vectors for performing a convolution operation. In some embodiments, as different portions of an activation data input matrix are processed, the same weight matrices are applied and the channel convolution processor unit can reuse the same prepared weight input vectors. By reusing the same weight matrices, the performance and efficiency of the convolution operation is significantly improved.

In some embodiments, weight input unit 300 is weight input unit 105 of FIG. 1 and the channel convolution processor unit connected to weight input unit 300 via connection 321 is channel convolution processor unit 107 of FIG. 1. In various embodiments, the weight vector inputs prepared by weight input unit 300 for the channel convolution processor unit are directed to a vector unit of the channel convolution processor such as vector units 111, 121, 131, or 141 of FIG. 1. Although 3×3 matrices are used in the example above, a different matrix size can be appropriate and weight input unit 300 can be configured to process the different matrix size by utilizing an appropriate number of weight input vector registers. For example, twenty-five weight input vector registers can be utilized to process and prepare convolution matrix arguments with 5×5 weight matrices.

Figure 4:
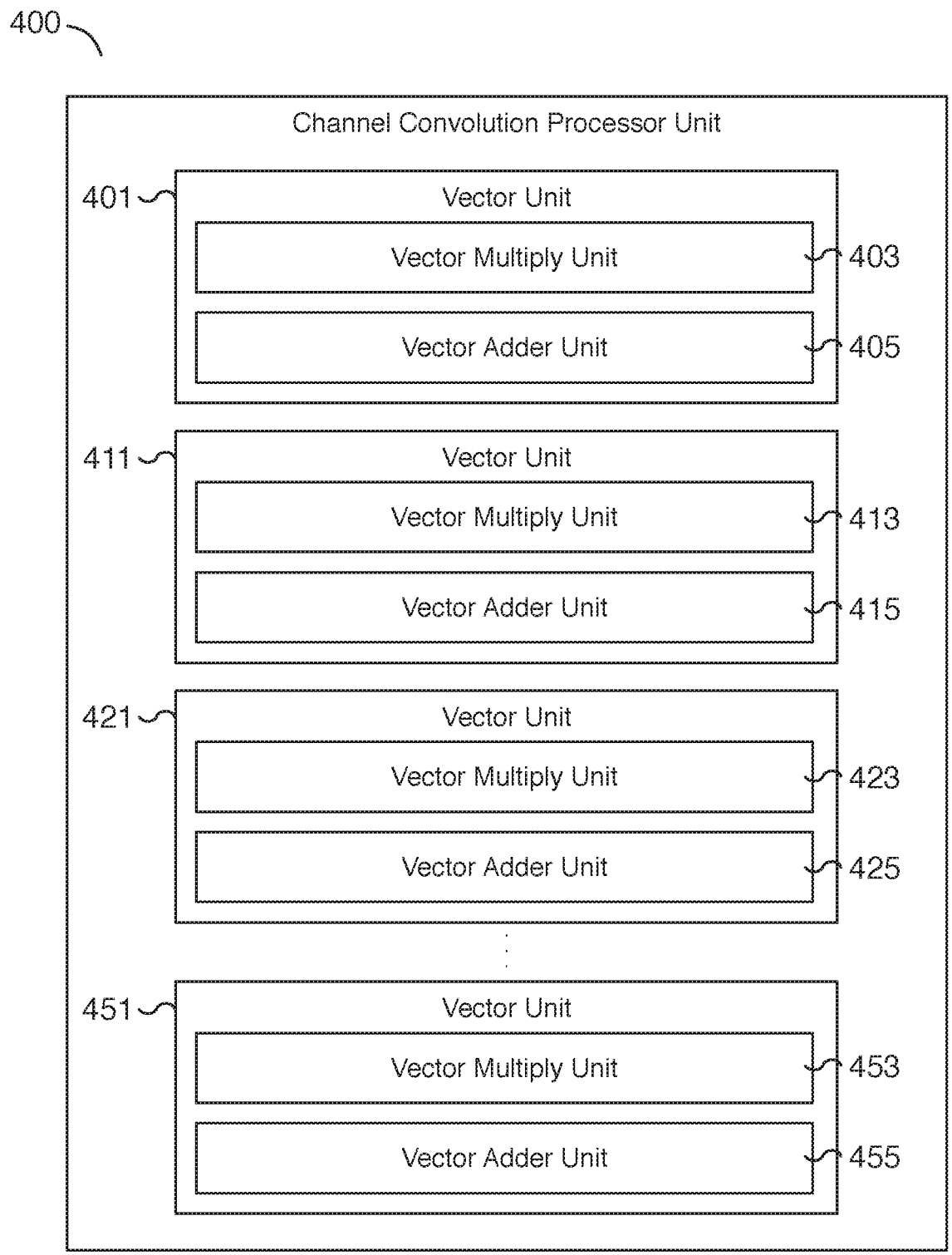
FIG. 4 is a block diagram illustrating an embodiment of a channel convolution processor unit for solving artificial intelligence problems using a neural network.

FIG. 4 is a block diagram illustrating an embodiment of a channel convolution processor unit for solving artificial intelligence problems using a neural network. In the example shown, channel convolution processor unit 400 includes multiple vector units including vector units 401, 411, 421, and 451. The three dots between vector units 421 and 451 indicate optional additional vector units (not shown). In various embodiments, a channel convolution processor unit may include more or fewer vector units. The number of vector units corresponds to the number of channels and associated weight matrices that can be processed in parallel. For example, a channel convolution processor unit may include 32 vector units, each capable of processing a channel of a portion of an activation data input matrix with an associated weight matrix. In some embodiments, each vector unit includes a vector multiply unit and a vector adder unit. In the example shown, vector unit 401 includes vector multiply unit 403 and vector adder unit 405. Similarly, vector unit 411 includes vector multiply unit 413 and vector adder unit 415, vector unit 421 includes vector multiply unit 423 and vector adder unit 425, and vector unit 451 includes vector multiply unit 453 and vector adder unit 455. In various embodiments, channel convolution processor unit 400 is channel convolution processor unit 107 of FIG. 1 and vector units 401, 411, 421, and 451 are vector units 111, 121, 131, and 141 of FIG. 1, respectively.

In some embodiments, each vector unit of channel convolution processor unit 400, such as vector units 401, 411, 421, and 451, receives two vector operands and can perform one or more vector operations using the operands. For example, a vector unit can compute the result of multiple multiply operations by multiplying each element of the first input vector with a corresponding element of a second input vector. The resulting multiplication results can be summed together to determine a channel convolution result data element. In some embodiments, the vector operands are a data input vector and a weight input vector and correspond to data elements of a single channel of a portion of an activation data input matrix and a weight matrix, respectively. In various embodiments, the data input vector and the weight input vector are received from a data input unit and a weight input unit, respectively. In some embodiments, the data input unit is data input unit 103 of FIG. 1 and/or data input unit 200 of FIG. 2 and the weight input unit is weight input unit 105 of FIG. 1 and/or weight input unit 300 of FIG. 3.

In the example shown, channel convolution processor unit 400 includes multiple vector units that each include a vector multiply and a vector adder unit. Each vector multiply unit, such as vector multiply units 403, 413, 423, or 453, is configured to multiply corresponding elements received via a data input unit (not shown) and a weight input unit (not shown). In some embodiments, the result is a vector of multiplication results. For example, for two 9-byte input vectors corresponding to two 3×3 matrices, the result of a vector multiply unit is a vector of 9 multiplication results. The first element from a data input vector is multiplied with the first element of a weight input vector. Similarly, the second element from a data input vector is multiplied with the second element of a weight input vector. In various embodiments, corresponding elements from a data input vector and a weight input vector are multiplied in parallel. In various embodiments, the vector of multiplication results is passed to a vector adder unit of the vector unit. For example, vector multiply unit 403 passes its multiplication results to vector adder unit 405, vector multiply unit 413 passes its multiplication results to vector adder unit 415, vector multiply unit 423 passes its multiplication results to vector adder unit 425, and vector multiply unit 453 passes its multiplication results to vector adder unit 455.

In some embodiments, each vector adder unit of a vector unit, such as vector adder units 405, 415, 425, or 455, is configured to compute addition operations using elements from an input vector. For example, the sum of selected elements from a vector of multiplication results computed by vector multiply unit 403 is computed by vector adder unit 405. Similarly, the sum of each of the elements from a vector of multiplication results computed by vector multiply unit 413 is computed by vector adder unit 415, the sum of each of the elements from a vector of multiplication results computed by vector multiply unit 423 is computed by vector adder unit 425, and the sum of each of the elements from a vector of multiplication results computed by vector multiply unit 453 is computed by vector adder unit 455. In some embodiments, the result of a vector adder unit is a dot product of the vectors used as input to the corresponding vector unit and vector multiply unit. In various embodiments, each vector adder unit, such as vector adder units 405, 415, 425, or 455, is implemented as an adder tree. For example, the top level of an adder tree may add pairs of elements to determine a set of partial sums, such as adding elements 0 and 1 to determine a first partial sum and elements 2 and 3 to determine a second partial sum, etc. Each subsequent level may sum pairs of partial sums from the previous level until the last level computes a final result sum. In various embodiments, each adder tree computes partial sums in parallel to arrive at a result sum. The parallel operation significantly improves the efficiency of summing a vector of numbers. In various embodiments, multiple vector units can operate in parallel to compute multiple results in parallel, significantly improving the throughput of channel convolution processor unit 400.

In some embodiments, the output of each vector unit, such as vector units 401, 411, 421, and 451, is a channel convolution result data element. The group of vector units of channel convolution processor unit 400 are used to determine multiple channel convolution result data elements in parallel, one for each channel associated with the input convolution matrix arguments to channel convolution processor unit 400. By processing different portions of an activation data input matrix, channel convolution processor unit 400 determines channel convolution result data elements for multiple portions of a channel convolution result matrix. In various embodiments, the weight input arguments to the vector units may be reused and across different data input arguments resulting in a significant efficiency and performance improvement.

In various embodiments, once a channel convolution data element result is determined, channel convolution processor unit 400 may push the result to memory or another location such as a downstream processing component. For example, a vector result may be first written to an output unit such as output unit 151 of FIG. 1 where results can then be transmitted to a downstream processing component or memory. In some embodiments, channel convolution processor unit 400 writes out an entire vector of results corresponding to a result for each vector unit. In various embodiments, the results are written to memory such as memory 161 of FIG. 1 using a channel-first layout format. By determining results in the same format as the layout used to write the results to memory, significant performance benefits are achieved.

Figure 5:
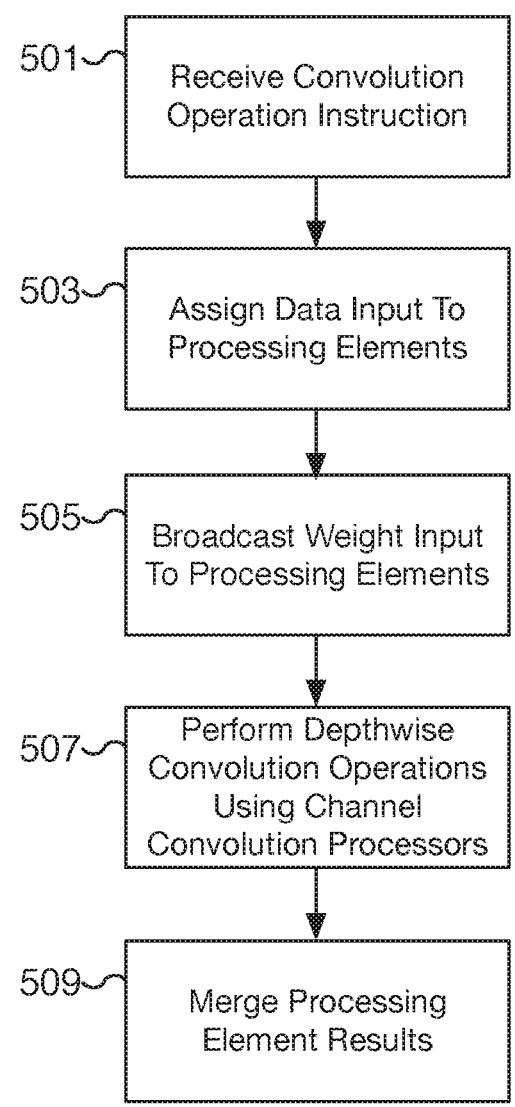
FIG. 5 is a flow chart illustrating an embodiment of a process for performing a three-dimensional convolution operation using a channel convolution processor.

FIG. 5 is a flow chart illustrating an embodiment of a process for performing a three-dimensional convolution operation using a channel convolution processor. For example, an artificial intelligence problem is solved using a neural network in part by analyzing one or more layers of a neural network by solving one or more three-dimensional convolution operations. A three-dimensional convolution operation may be initiated by issuing a convolution operation instruction and specifying the appropriate three-dimensional activation data input matrix and corresponding weight matrices. Parts of the convolution operation corresponding to different portions of the three-dimensional activation data input matrix and associated weight matrices can be assigned and performed by different processing elements. The performance can be significantly improved by distributing the workload across different processing elements. Each processing element receives a corresponding portion of the three-dimensional activation data input matrix and associated weight matrices. In some embodiments, the same weight matrices are used by multiple different processing elements and the weight matrices are broadcasted to the applicable processing elements to improve memory bandwidth efficiency. At each processing element, a channel convolution processor unit is utilized for performing depth-wise convolution operations on the assigned portions of the activation data and weight convolution input arguments. For example, each processing element can process an instruction indicating a portion of an activation data input matrix and corresponding weight matrices to perform depthwise convolution operations. The instruction for a particular processing element can specify the location of the assigned portions of the activation data input matrix and the corresponding weight matrices in memory or another location. In some embodiments, the convolution operations are performed using a processing element such as processing element 101 of FIG. 1 and in particular using a channel convolution processor unit such as channel convolution processor unit 107 of FIG. 1 and/or channel convolution processor unit 400 of FIG. 4. In some embodiments, a data input unit and a weight input unit prepare the convolution input arguments for the channel convolution processor unit. In some embodiments, the data input unit is data input unit 103 of FIG. 1 and/or data input unit 200 of FIG. 2 and the weight input unit is weight input unit 105 of FIG. 1 and/or weight input unit 300 of FIG. 3. In some embodiments, the results of each channel convolution processor unit are gathered at an output unit of the processing element such as output unit 151 of FIG. 1.

At 501, a convolution operation instruction is received. For example, a convolution operation specifies a three-dimensional activation data input matrix or a portion of a three-dimensional activation data input matrix. The data may correspond to an image or another appropriate data set with width, height, and channel dimensions. The convolution operation also specifies a set of filters such as a set of two-dimensional weight matrices for applying to the specified activation data. The two-dimensional weight matrices are all sized the same and may be 3×3 matrices although another size can be appropriate as well. In various embodiments, the number of weight matrices equals the channel depth of the activation data. In some embodiments, the convolution operation is expressed as one or more instructions, such as one or more convolution operation instructions received by a processing system. In various embodiments, the processing system can include one or more processing elements, where each processing element includes a channel convolution processor unit, a data input unit, a weight input unit, and an output unit.

At 503, data input is assigned to processing elements. For example, different three-dimensional portions of the specified activation data are assigned to different processing elements. Each of the processing elements is assigned to process its corresponding portion of the three-dimensional activation data input matrix. By distributing the workload across multiple processing elements, the performance of the convolution operation is improved as parts of the convolution operation corresponding to the different assigned portions of the activation data are processed in parallel. For each assigned portion of the data input, there exists a corresponding set of weight matrices. The assigned data is transmitted to the appropriate processing elements.

At 505, weight input is broadcasted to processing elements. The appropriate weight input corresponding to the assigned portions of the specified activation data is transmitted to the corresponding processing elements. In various embodiments, processing elements assigned to activation data from the same channels utilize the same weight input and the same weight input is broadcasted to the corresponding processing elements. By utilizing a broadcast instead of individual transmissions, the resources required to load the processing elements with the appropriate weight input are reduced and a significant performance improvement is achieved.

At 507, depthwise convolution operations using channel convolution processors are performed. For example, each processing element processes its assigned portion of the three-dimensional activation data input matrix with the appropriate weight matrices using a channel convolution processor unit. In various embodiments, each processing element loads its channel convolution processor unit with input activation data processed by a data input unit and weight data processed by a weight input unit. The channel convolution processor unit performs depthwise convolution on the assigned portions and channels of the activation data to determine corresponding channel convolution result data elements. After an initial portion of the assigned data is processed, the processing element iterates until all remaining assigned data is processed. In various embodiments, the weight input is loaded into the channel convolution processor unit of each processing element only once even as additional activation data is incrementally loaded. The results from performing depthwise convolution operations using the channel convolution processors correspond to data elements of a channel convolution result matrix. In some embodiments, each processing element gathers its results at an output unit of the processing element. The results can then be transmitted to another memory location (and/or component) outside of the processing element.

At 509, processing element results are merged. For example, results from each processing element determined at step 507 are written to memory such as memory 161 of FIG. 1. The channel convolution result data elements determined at step 507 are merged to create a channel convolution result matrix. In various embodiments, each processing element writes its results to memory and the final channel convolution result matrix is stored in memory. In some embodiments, the channel convolution result matrix is stored in another location such as a local memory cache and used as an input activation data matrix for a subsequent matrix and/or convolution operation.

Figure 6:
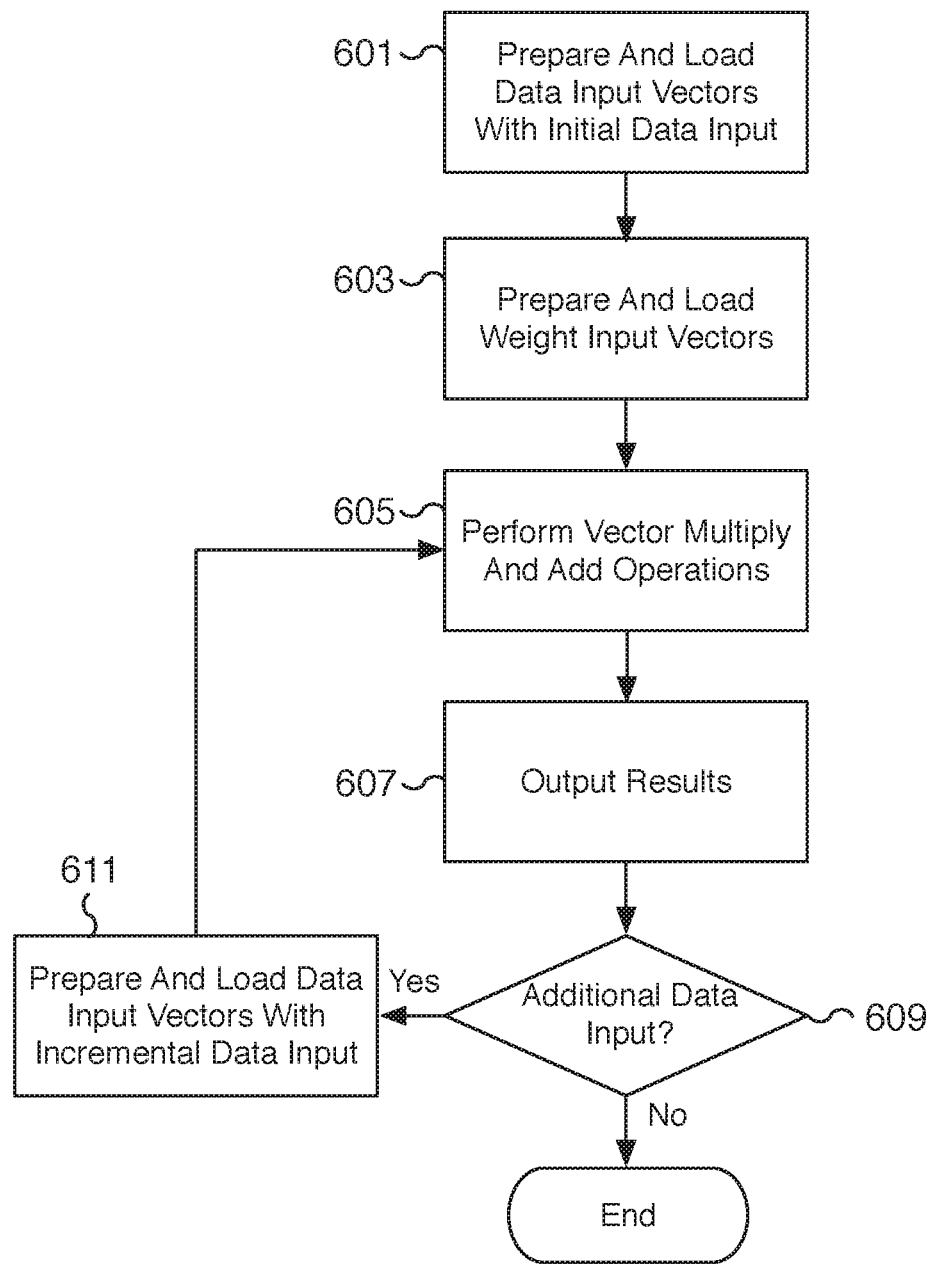
FIG. 6 is a flow chart illustrating an embodiment of a process for performing depthwise convolution using a channel convolution processor.

FIG. 6 is a flow chart illustrating an embodiment of a process for performing depthwise convolution using a channel convolution processor. For example, data input vectors are loaded into vector units of a channel convolution processor along with weight input vectors to determine channel convolution result data element results. Each data input vector is a two-dimensional sub-matrix of a portion of a three-dimensional activation data input matrix. Each weight input vector is a two-dimensional weight matrix associated with a channel of the three-dimensional activation data input matrix. Each vector unit performs a dot product result to determine a channel convolution result data element result. In various embodiments, once an initial set of data input and the corresponding weight input matrices are loaded into vector units of the channel convolution processor, subsequent portions of the activation data input matrix are processed by only loading incremental portions of the activation data input matrix. The weight input matrices and portions of the data input used to determine the previous convolution results are reused with improved efficiency and performance benefits.

In some embodiments, the process of FIG. 6 is performed as part of the process of FIG. 5. For example, in some embodiments, the steps 601, 609, and/or 611 are performed at 503 of FIG. 5, the step 603 is performed at 505 of FIG. 5, and the steps 605 and 607 are performed at 507 and/or 509 of FIG. 5. In some embodiments, the process of FIG. 6 is performed using a processing element such as processing element 101 of FIG. 1 and a channel convolution processor unit such as channel convolution processor unit 107 of FIG. 1 and/or channel convolution processor unit 400 of FIG. 4. In some embodiments, the data input and weight input for the vector units of the channel convolution processor unit are prepared by a data input unit and weight input unit, respectively, and the channel convolution results are gathered at an output unit. In some embodiments, the data input unit is data input unit 103 of FIG. 1 and/or data input unit 200 of FIG. 2, the weight input unit is weight input unit 105 of FIG. 1 and/or weight input unit 300 of FIG. 3, and the output unit is output unit 151 of FIG. 1.

At 601, data input vectors are prepared with an initial set of data input and loaded to vector units of a channel convolution processor unit. For example, data elements corresponding to a subset of a three-dimensional activation data input matrix are prepared as data input vectors for the initial set of data input. In various embodiments, the initial set of data input requires loading each data element. In some embodiments, each data input vector corresponds to a two-dimensional sub-matrix or matrix slice of the activation data input matrix and corresponds to a particular channel. The number of data input vectors corresponds to the number of vector units of the channel convolution processor unit and is the number of channels that can be processed in parallel. For example, in the event 32 channels are processed in parallel, 32 data input vectors are prepared and one is loaded into each vector unit of the channel convolution processor unit. In some embodiments, each matrix stored in a data input vector is a 3×3 matrix and matches the size of a corresponding weight matrix. In various embodiments, the size of the matrices may be another size, such as 5×5, 7×7, 9×9, 11×11 or another appropriate size. The size of each data input vector is based on the size of the matrix and is the number of elements of the matrix. For example, for a 3×3 matrix, each data input vector has 9 data elements and the vector unit can process 9 data elements to go along with 9 weight elements. As another example, for a 5×5 matrix, each data input vector has 25 data elements and the vector unit can process 25 data elements to go along with 25 weight elements.

In various embodiments, once prepared, each data input vector is loaded to an appropriate vector unit of the channel convolution processor unit. For example, each vector unit of the channel convolution unit is loaded with a prepared data input vector. The elements of the prepared data input vector correspond to a sub-matrix from a single channel of the activation data input matrix. In various embodiments, the corresponding data elements of each data input vector each have the same width and height location in the activation data input matrix but have different channel locations. In addition to the data input vector, each vector unit receives a corresponding weight input vector at 603.

At 603, weight input vectors are prepared and loaded to vector units of a channel convolution processor unit. For example, weight data elements corresponding to a set of weight matrices associated with a portion of a three-dimensional activation data input matrix are prepared as weight input vectors. In various embodiments, the weight elements associated with the initial set of activation data input requires loading each weight data element to the corresponding vector units. In some embodiments, processing of subsequent additional activation data can reuse the same weight input data without additional processing to prepare new weight input vectors. In some embodiments, each weight input vector corresponds to a different two-dimensional weight matrix associated with a different channel of the activation data input matrix. The number of weight input vectors corresponds to the number of vector units of the channel convolution processor unit and is the number of channels that can be processed in parallel. For example, in the event 32 channels are processed in parallel, 32 weight input vectors are prepared and one is loaded into each vector unit of the channel convolution processor unit. In some embodiments, each weight matrix stored in a weight input vector is a 3×3 weight matrix and matches the size of a corresponding activation data sub-matrix. In various embodiments, the size of the weight matrices may be another size, such as 5×5 weight matrices or another appropriate size. The size of each weight input vector is based on the size of the weight matrix and is the number of elements of the matrix. For example, for a 3×3 weight matrix, each weight input vector has 9 weight data elements and the vector unit can process 9 weight data elements to go along with 9 activation data elements. As another example, for a 5×5 weight matrix, each weight input vector has 25 weight data elements and the vector unit can process 25 weight data elements to go along with 25 activation data elements.

In various embodiments, once prepared, each weight input vector is loaded to an appropriate vector unit of the channel convolution processor unit based on the corresponding data input vector. For example, each vector unit of the channel convolution unit is loaded with a prepared weight input vector. The elements of the prepared weight input vector correspond to a weight matrix associated with a sub-matrix from a single channel of the activation data input matrix. In addition to the weight input vector, each vector unit receives a corresponding data input vector at 601.

At 605, vector multiply and vector add operations are performed. Utilizing the input vectors loaded from data input vectors at 601 or 611 and from weight input vectors at 603, each corresponding vector unit of a channel convolution processor unit performs vector multiply and add operations. Each element from a data input vector is multiplied by its corresponding element from a weight input vector. The result is a vector of multiplication results. For example, using 3×3 data and weight matrices, each one of nine data elements is multiplied against a corresponding one of nine weight elements to determine nine multiplication results. In some embodiments, the vector multiplication operation is performed by a vector multiply unit of a vector unit. Using the vector multiply result, a vector sum result is calculated by adding each of the elements from the vector of multiplication results. In various embodiments, the result is a channel convolution result data element of a channel convolution result matrix. In some embodiments, the sum is determined using a vector adder unit of the vector unit. For example, a vector adder unit using an adder tree can compute the sum of the vector elements. In some embodiments, each vector unit of a channel convolution processor unit performs a dot product operation using its corresponding loaded data input vector and weight input vector. The dot product result is a channel convolution result data element of a channel convolution result matrix.

In some embodiments, each vector unit performs its vector operations in parallel. For example, a channel convolution processor unit with 32 vector units can compute 32 convolution result data elements corresponding to 32 different channels. In some embodiments, each vector unit group independently determines the results associated with its assigned convolution operation in parallel with the other vector units of other vector unit groups.

At 607, results are outputted. For example, the vector result determined by performing the matrix multiply and add operations at 605 is outputted from the channel convolution processor unit. In various embodiments, the vector results are outputted as an output vector result, for example, to an output unit such as output unit 151 of FIG. 1. The output unit may be used to write the output vector result to memory. In some embodiments, the results are outputted and used as an argument to a subsequent matrix operation.

At 609, a determination is made whether additional data input remains to be processed. For example, when traversing the assigned portion of an activation data input matrix horizontally along the width dimension, a determination is made whether additional columns of the assigned portion of an activation data input matrix exist. Similarly, when traversing vertically along the height dimension of the assigned portion of an activation data input matrix, a determination is made whether additional rows exist. In the event additional data input of the assigned portion of an activation data input matrix remains to be processed, processing proceeds to 611. In the event no additional data input remains to be processed, processing ends.

At 611, data input vectors using incremental data input are prepared and loaded to vector units of a channel convolution processor unit. For example, incremental data corresponding to the next column (or row) of data of the assigned portion of an activation data input matrix is loaded. When traversing horizontally along the width dimension, an additional column of the assigned portion of an activation data input matrix is loaded. Similarly, when traversing vertically along the height dimension, an additional row of the assigned portion of an activation data input matrix is loaded. This incremental data is used along with data loaded from the previous iteration of 601 or 611 to prepare input data vectors. For example, when traversing horizontally, data from the second and third columns of the previous iteration are shifted to the first and second columns and combined with the newly loaded third column to create new data input vectors. The new data input vectors correspond to shifting the sub-matrix slice of an activation data input matrix horizontally. In some embodiments, the new data input vectors correspond to sliding the relevant convolution matrix of the activation data along the width dimension. Similarly, when traversing vertically, data from the second and third rows of the previous iteration are shifted to the first and second rows and combined with the newly loaded third row to create new data input vectors. The new data input vectors correspond to shifting the sub-matrix slice of an activation data input matrix vertically. In some embodiments, the new data input vectors correspond to sliding the relevant convolution matrix of the activation data along the height dimension. In various embodiments, only the initial set of data input requires loading an entire matrix of data elements and is performed at 601. At 611, only incremental data elements are needed.

In various embodiments, the new data input vectors corresponding to a new sub-matrix of the assigned activation data input matrix are loaded to the corresponding vector units. The existing weight input vectors can be reused since the relative channel dimensions have not changed. By only loading the new incremental activation data and reusing the weight data elements, significant performance improvements are achieved when performing the convolution operation.

Figure 7:
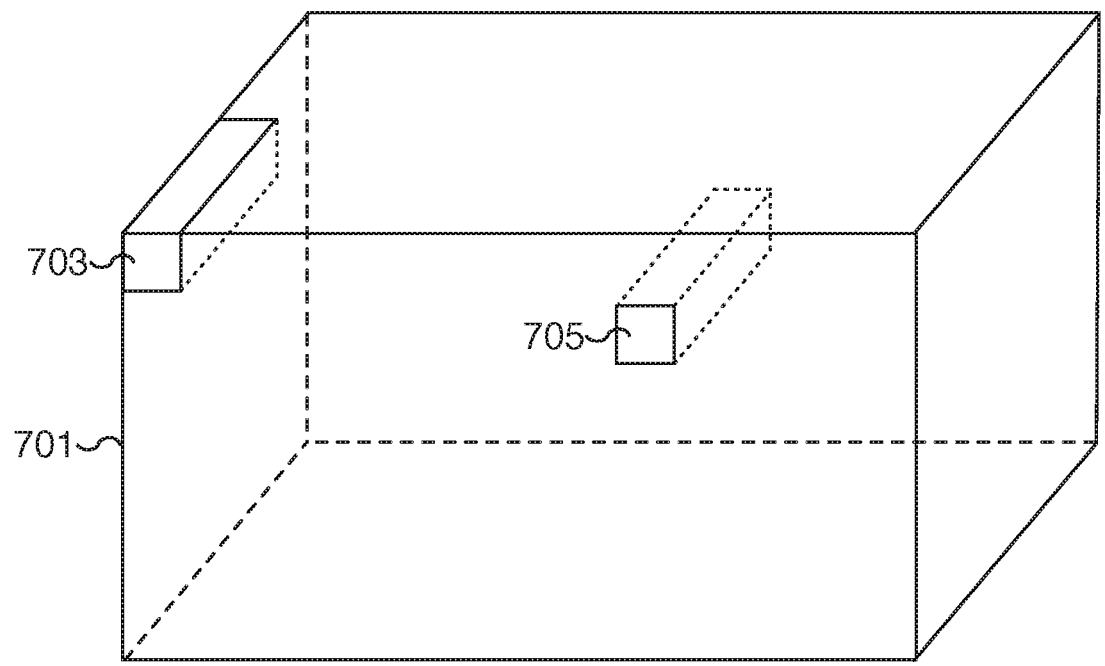
FIG. 7 is a diagram illustrating an example activation data input matrix for performing a convolution operation.

FIG. 7 is a diagram illustrating an example activation data input matrix for performing a convolution operation. In the example shown, three-dimensional activation data input matrix 701 includes three-dimensional sub-matrices 703 and 705. In some embodiments, a convolution operation is performed using activation data input matrix 701 with a group of two-dimensional weight matrices. In some embodiments, activation data input matrix 701 may be a portion of a larger three-dimensional matrix (not shown). Activation data input matrix 701 includes width, height, and channel dimensions. The corresponding two-dimensional weight matrices may include as many weight matrices as there are channels for activation data input matrix 701.

In some embodiments, a portion of activation data input matrix 701 is assigned to a processing element for performing portions of the convolution operation. For example, vertical or horizontal portions can be assigned to different processing elements to perform convolution operations using the processes of FIGS. 5 and/or 6. The number of channels associated with the assigned portions is based on the number of vector units of the channel convolution processor unit. For example, a channel convolution processor unit with 32 vector units can process a three-dimensional portion of activation data input matrix 701 that includes 32 channels. In some embodiments, three-dimensional sub-matrices 703 and 705 have width and height dimensions the same as the associated two-dimensional weight matrices and a channel dimension the same as the number of vector units of the channel convolution processor unit. For example, three-dimensional sub-matrices 703 and 705 may each have the dimensions 3×3×32. In some embodiments, the sub-matrices 703 and 705 represent the data elements a channel convolution processor unit can process during one iteration (or cycle). A subsequent iteration (or cycle) processes an additional column (or row) of data elements by sliding the three-dimensional sub-matrices used as convolution arguments horizontally or vertically along the width or height dimension of activation data input matrix 701 but keeping the same channels. Sub-matrices 703 and 705 are just two examples of the possible convolution arguments to a channel convolution processor unit. In some embodiments, sub-matrix 703 represents an initial set of data input to a channel convolution processor unit of a processing element and sub-matrix 705 represents a subsequent set of data input for a different processing element. In some embodiments, for each respectively assigned processing element, sub-matrix 703 is prepared at 601 of FIG. 6 and sub-matrix 705 is prepared at 611 of FIG. 6. In various embodiments, the channel convolution processor unit is channel convolution processor unit 107 of FIG. 1 and/or channel convolution processor unit 400 of FIG. 4.

In various embodiments, the sub-matrices 703 and 705 are prepared as arguments for a channel convolution processor unit by a data input unit such as data input unit 103 of FIG. 1 and/or data input unit 200 of FIG. 2. Each channel of a sub-matrix may be converted by the data input unit into a corresponding data input vector by linearizing the two-dimensional matrix for a particular channel into a one-dimensional vector for a vector unit of the channel convolution processor unit. In various embodiments, activation data input matrix 701 and sub-matrices 703 and 705 are stored using a channel-first layout and sub-matrices 703 and 705 are retrieved using channel-first layout memory reads. For example, the data element at width, height, and channel location (1,1,1) of a sub-matrix is stored adjacent to the data element at width, height, and channel location (1,1,2) of the same sub-matrix and the two data elements can be read together with a single memory read and/or cache line memory read. For a 32-data element cache line, data elements (1,1,1) through (1,1,32) can be read in a single memory read. A subsequent read can load the data elements at width, height, and channel location (1,2,1) through (1,2,32) of the same sub-matrix. In various embodiments, each memory read stores the corresponding data elements in a data input vector register such as data input vector register 201, 203, 205, 207, or 209 of FIG. 2. Once the data elements are loaded from memory, the corresponding elements of the same channel can be prepared into a data input vector.

Figure 8:
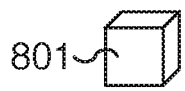
FIG. 8 is a diagram illustrating an example group of weight matrices for performing a convolution operation.
Figure 8:
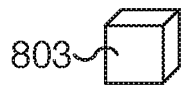
Figure 8:
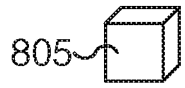
Figure 8:
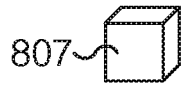
Figure 8:
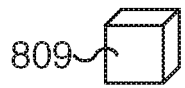

FIG. 8 is a diagram illustrating an example group of weight matrices for performing a convolution operation. In the example shown, two-dimensional weight matrices 801, 803, 805, 807, and 809 make up a group of weight matrices for performing a convolution operation with an activation data input matrix such as activation data input matrix 701 of FIG. 7. The total number of weight matrices may match the channel dimension of the applicable activation data input matrix. A subset of the weight matrices, matching in number to the number of vector units and the channel depth of the convolution data argument, such as sub-matrix 703 and 705 of FIG. 7, is utilized as the corresponding convolution weight argument to a channel convolution processor unit. In the example shown, the width and height dimensions of each weight matrix 801, 803, 805, 807, and 809 match the width and height dimensions of each three-dimensional convolution data matrix argument such as sub-matrix 703 and 705 of FIG. 7. For example, in some embodiments, each of 32 two-dimensional weight matrices has dimensions 3×3×1 to go along with a three-dimensional convolution data matrix with dimensions 3×3×32.

In various embodiments, the weight matrices 801, 803, 805, 807, and 809 are prepared as arguments for a channel convolution processor unit by a weight input unit such as weight input unit 105 of FIG. 1 and/or weight input unit 300 of FIG. 3. Each weight matrix may be converted by the weight input unit into a corresponding weight input vector by linearizing the two-dimensional weight matrix into a one-dimensional vector for a vector unit of the channel convolution processor unit. In various embodiments, weight matrices 801, 803, 805, 807, and 809 are stored and retrieved using a depth-first layout. For example, the data elements at width and height location (1,1) of weight matrices 801, 803, 805, and 807 are stored adjacent to one another and can be read together with a single memory read and/or cache line memory read. A subsequent read can load the data elements at width and height location (1,2) of the weight matrices 801, 803, 805, and 807. In various embodiments, each memory read stores the corresponding data elements in a weight input vector register such as weight input vector register 301, 303, 305, 307, or 309 of FIG. 3. Once the data elements are loaded from memory, the corresponding elements of the same weight matrix can be prepared as a weight input vector. The data elements of weight matrix 809 may be separated from the data elements of weight matrices 801, 803, 805, and 807 by any number of additional weight matrices.

Figure 9:
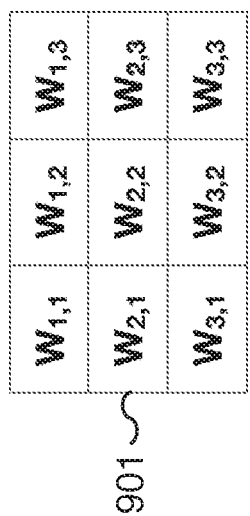
FIG. 9 is a diagram illustrating an example weight matrix for performing a channel convolution operation.

FIG. 9 is a diagram illustrating an example weight matrix for performing a channel convolution operation. In FIG. 9, weight matrix 901 represents an exemplar 3×3 matrix of weight elements. Other dimensions for a weight matrix may be appropriate as well, such as 1×1, 5×5, 7×7, 9×9, etc. In the example shown, the subscripts associated with each weight element use a row and column notation with initial offsets starting at 1. For the first row of weight matrix 901, $W_{1,1}$ is the weight element located at column 1, $W_{1,2}$ is the weight element located at column 2, and $W_{1,3}$ is the weight element located at column 3. In various embodiments, weight matrix 901 is one of the weight matrices 801, 803, 805, 807, or 809 of FIG. 8.

In some embodiments, weight matrix 901 is an input convolution matrix argument for performing a channel convolution operation and is prepared by a weight input unit such as weight input unit 105 of FIG. 1 and/or weight input unit 300 of FIG. 3. Once prepared, the weight data elements of weight matrix 901 are loaded to a vector unit of a channel convolution processor unit. For example, a weight input unit can prepare weight matrix 901 as a weight input vector that is loaded as one vector operand to a vector unit of a channel convolution processor unit. In some embodiments, the channel convolution processor unit is channel convolution processor unit 107 of FIG. 1 and/or channel convolution processor unit 400 of FIG. 4 and a channel convolution is performed using the processes of FIGS. 5 and/or 6.

Figure 10:
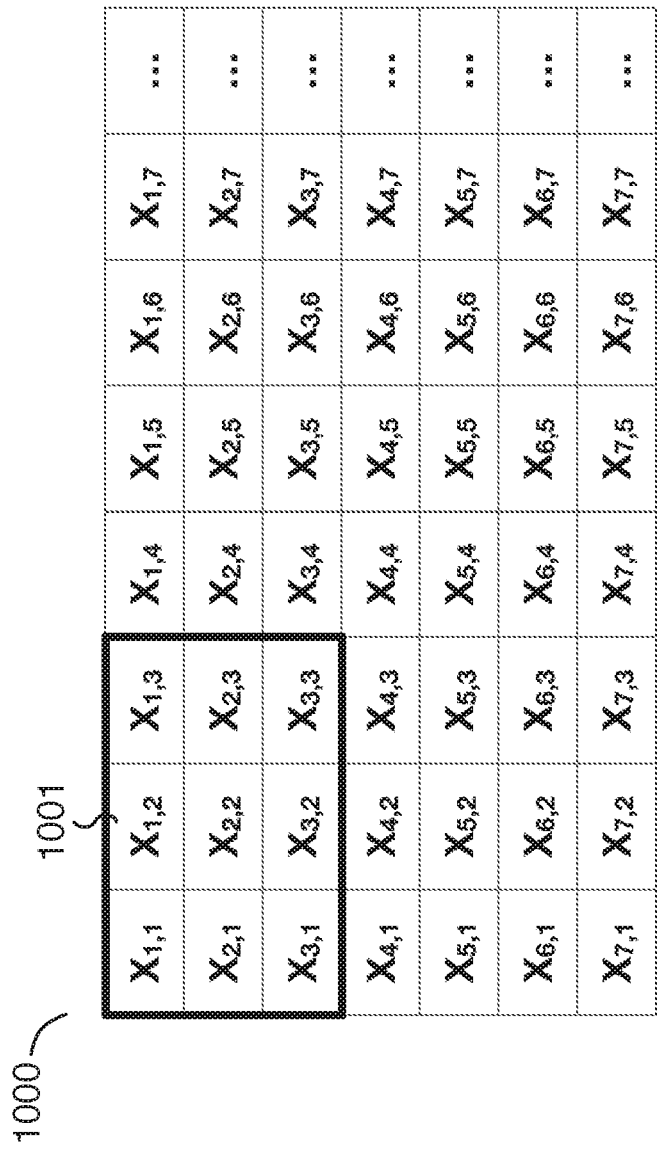
FIG. 10 is a diagram illustrating a single channel of an example activation data input matrix for performing a channel convolution operation.

FIG. 10 is a diagram illustrating a single channel of an example activation data input matrix for performing a channel convolution operation. The dimensions of activation data input matrix 1000 are larger than its corresponding weight matrix such as weight matrix 901 of FIG. 9. In the example of FIG. 10, only rows and columns 1-7 and a single channel of activation data input matrix 1000 are shown. The width and height of activation data input matrix 1000 can extend past the depicted rows and columns and activation data input matrix 1000 includes multiple channels (not shown). In the example shown, the subscripts associated with each data element of activation data input matrix 1000 use a row and column notation with initial offsets starting at 1. The channel dimensions are not shown and each data element of activation data input matrix 1000 shares the same channel dimension.

In the example of FIG. 10, sub-matrix 1001 is a sub-matrix of activation data input matrix 1000 and matches the dimensions of its corresponding weight matrix such as weight matrix 901 of FIG. 9. In various embodiments, sub-matrix 1001 and weight matrix 901 of FIG. 9 are convolution matrix arguments and can be processed by a single vector unit of a channel convolution processor unit using the techniques described herein. In some embodiments, sub-matrix 1001 is an input convolution matrix argument for performing a channel convolution operation and is prepared by a data input unit such as data input unit 103 of FIG. 1 and/or data input unit 200 of FIG. 2. Once prepared, the data elements of sub-matrix 1001 are loaded to a vector unit of a channel convolution processor unit. For example, a data input unit can prepare sub-matrix 1001 as a data input vector that is loaded as one vector operand to a vector unit of a channel convolution processor unit. In some embodiments, the channel convolution processor unit is channel convolution processor unit 107 of FIG. 1 and/or channel convolution processor unit 400 of FIG. 4 and a channel convolution is performed using the processes of FIGS. 5 and/or 6. In various embodiments, activation data input matrix 1000 corresponds to a single channel of activation data input matrix 701 of FIG. 7 and sub-matrix 1001 corresponds to a single channel of sub-matrix 703 or 705 of FIG. 7.

Figure 11:
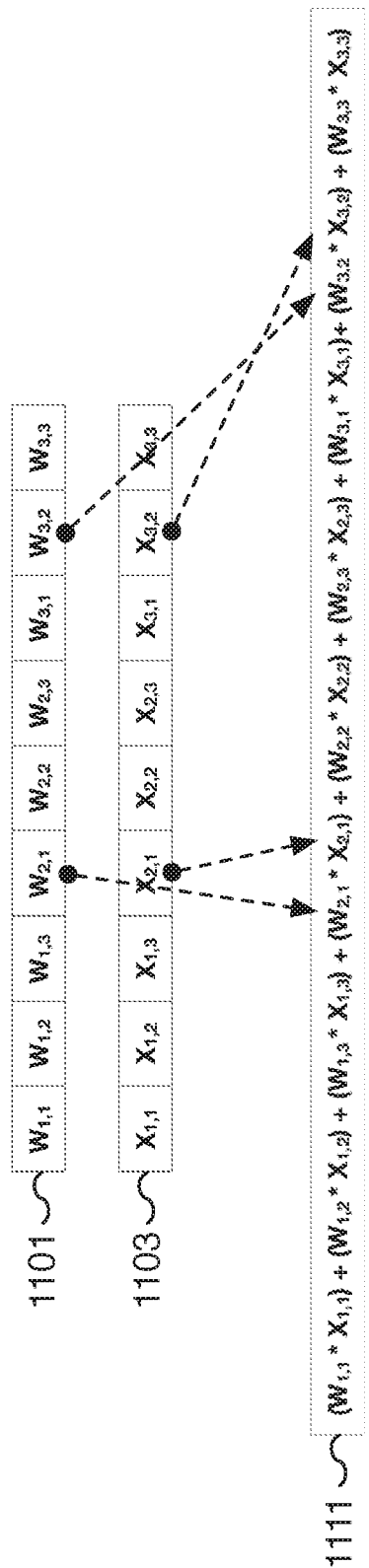
FIG. 11 is a diagram illustrating an example of vector computations for performing a channel convolution operation.

FIG. 11 is a diagram illustrating an example of vector computations for performing a channel convolution operation. FIG. 11 includes weight input vector 1101 and data input vector 1103. Weight input vector 1101 and data input vector 1103 each include nine data elements corresponding to a 3×3 matrix. In some embodiments, weight input vector 1101 corresponds to a linearized version of weight matrix 901 of FIG. 9 and data input vector 1103 corresponds to a linearized version of sub-matrix 1001 of FIG. 10. Weight input vector 1101 and data input vector 1103 are examples of two input vectors loaded into a vector unit of a channel convolution processor unit for performing vector operations to determine a channel convolution result data element. In some embodiments, the vector units are vector units 111, 121, 131, or 141 of FIG. 1 and/or vector units 401, 411, 421, or 451 of FIG. 4. In various embodiments, each of the vector units of a channel convolution processor unit is loaded with a corresponding pair of input vectors. The two input vectors correspond to a two-dimensional sub-matrix of the assigned portion of the activation data input matrix for a processing element and a corresponding weight matrix.

In some embodiments, cell 1111 illustrates the equivalent vector computations performed by a vector unit of a channel convolution processor unit on input vectors of weight input vector 1101 and data input vector 1103. The vector computation result shown in cell 1111 is the result determined by multiplying each element of weight input vector 1101 against a corresponding element of data input vector 1103. The nine elements from weight input vector 1101 are multiplied against the nine elements of data input vector 1103 to determine nine multiplication results. In the example shown, cell 1111 includes the nine multiplication terms corresponding to the nine multiplication results. The arrows in FIG. 11 call out two of the nine multiplication results and their corresponding operands as examples. The arrows show that weight element $W_{2,1}$ is multiplied with corresponding data element $X_{2,1}$ to determine a multiplication result ($W_{2,1}*X_{2,1}$) and that weight element $W_{3,2}$ is multiplied with corresponding data element $X_{3,2}$ to determine a multiplication result ($W_{3,2}*X_{3,2}$).

In some embodiments, the multiplication shown in cell 1111 is performed using a vector multiply unit such as vector multiply unit 403, 413, 423, or 453 of FIG. 4. In some embodiments, the multiplication results are fed as a vector into a vector adder unit to compute the sum of the multiplication results. The vector sum may be performed using a vector adder unit such as vector adder unit 405, 415, 425, or 455 of FIG. 4. In the example shown, the result of the vector operations performed is a single result sum and a channel convolution result data element of a channel convolution result matrix. In some embodiments, the result sum is a dot product computed using weight input vector 1101 and data input vector 1103. The result sum may be outputted as one element of a vector result and transmitted to an output unit such as output unit 151 of FIG. 1. In some embodiments, the equivalent of the vector computation result shown in cell 1111 is performed using channel convolution processor unit 107 of FIG. 1 and/or the processes of FIGS. 5 and/or 6. In some embodiments, the vector computations are performed at 507 of FIG. 5 and/or 605 of FIG. 6.

Figure 12:
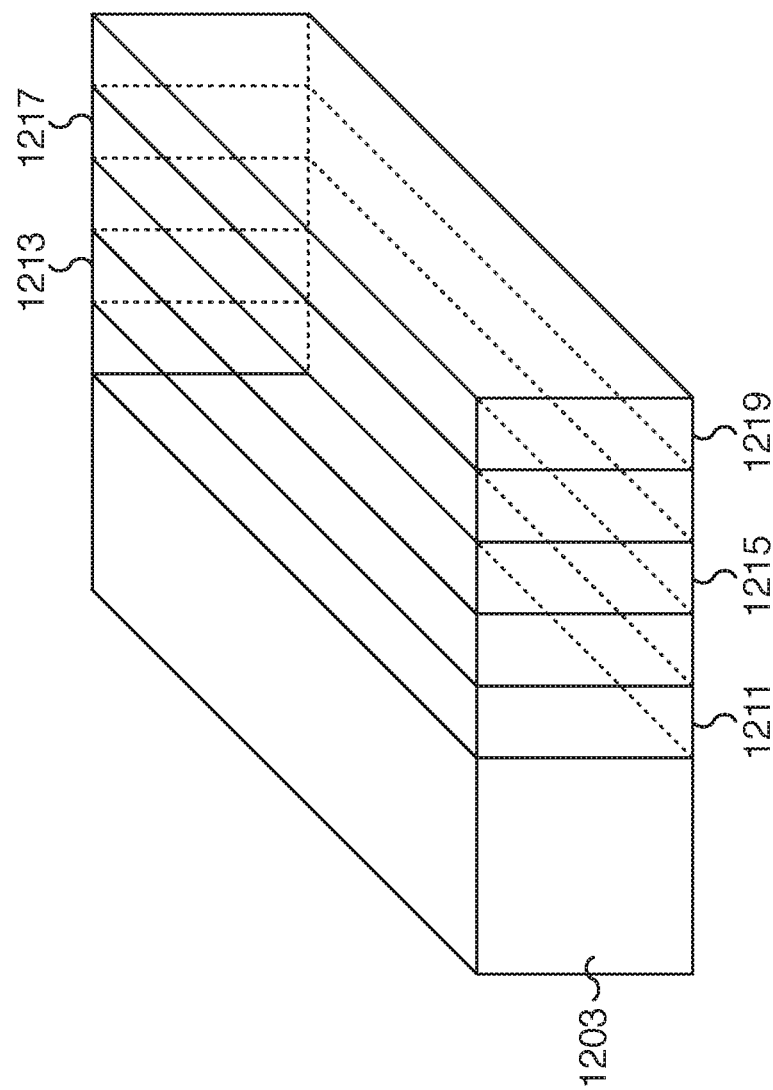
FIG. 12 is a diagram illustrating an example horizontal traversal of an activation data input matrix for performing a convolution operation.

FIG. 12 is a diagram illustrating an example horizontal traversal of an activation data input matrix for performing a convolution operation. In the example shown, three-dimensional sub-matrix 1203 is a portion of an activation data input matrix assigned to a processing element. Sub-matrix 1203 corresponds to the initial set of data input processed by a channel convolution processor unit. In some embodiments, sub-matrix 1203 is prepared and loaded to a channel convolution processor unit at step 601 of FIG. 6. Once the channel convolution result data elements associated with sub-matrix 1203 have been determined, additional portions of the activation data input matrix are processed by loading incremental data input. In the example of FIG. 12, the incremental data input is processed by traversing the activation data input matrix horizontally. Vertical columns 1211, 1213, 1215, 1217, and 1219 are incremental data input processed for each successive iteration (or cycle) in the process of determining channel convolution results and correspond to vertical slices of the activation data input matrix. In various embodiments, the process used to determine channel convolution results is the process of FIGS. 5 and/or 6. For example, each of vertical columns 1211, 1213, 1215, 1217, and 1219 is loaded during a different iteration at step 611 of FIG. 6. Additional vertical columns are loaded and processed until there is no additional data input of the assigned portion of the activation data input matrix to the processing element. In some embodiments, the width and height of sub-matrix 1203 is 3×3 and the corresponding width and height of each vertical column 1211, 1213, 1215, 1217, and 1219 is 1×3. Sub-matrix 1203 and vertical columns 1211, 1213, 1215, 1217, and 1219 have the same depth in the channel dimension, which may be a cache-line or multiple of a cache-line. In some embodiments, sub-matrix 1203 is an initial sub-matrix of an activation data input matrix such as sub-matrix 703 of FIG. 7.

In the example shown, the activation data input matrix is traversed horizontally and to the right although the left direction is possible as well. When traversing to the right, each newly loaded vertical column, such as vertical column 1211, 1213, 1215, 1217, and 1219, replaces as input data the left-most column of the previous sub-matrix. For example, vertical column 1211 replaces the left-most column of data elements of sub-matrix 1203. The result of loading each new vertical column to replace the left-most column is to slide the relevant sub-matrix horizontally to iteratively process the entire assigned portion of the activation data input matrix. In some embodiments, an example of a sub-matrix prepared using incremental data input is sub-matrix 705 of FIG. 7.

FIG. 13 is a diagram illustrating a single channel of an example activation data input matrix traversed horizontally for performing a channel convolution operation. Activation data input matrix 1300 is activation data input matrix 1000 of FIG. 10 and sub-matrix 1301 is a new sub-matrix for processing channel convolution results after channel convolution results are determined for sub-matrix 1001 of FIG. 10. In some embodiments, sub-matrix 1001 of FIG. 10 is processed during the previous iteration or cycle prior to processing sub-matrix 1301. For example, sub-matrix 1001 of FIG. 10 is prepared at step 601 of FIG. 6 and sub-matrix 1301 is prepared at step 611 of FIG. 6. Sub-matrix 1301 is prepared in part by loading a new vertical column of data elements corresponding to the data elements $X_{1,4}$, $X_{2,4}$, and $X_{3,4}$. The new data elements replace the left-most column of the previous sub-matrix corresponding to data elements $X_{1,1}$, $X_{2,1}$, and $X_{3,1}$. In some embodiments, the new vertical column is a vertical column such as 1211 of FIG. 12.

In various embodiments, sub-matrix 1301 is processed with the same weight matrix as the sub-matrix processed during the previous iteration. To prepare the corresponding data elements of sub-matrix 1301 to be loaded to a vector unit of a channel convolution processor unit, only the new vertical column of data elements needs to be loaded. For example, only memory reads for the data elements of the new column need to be issued and performed since the data elements from the remaining columns can be reused from previously performed memory reads. In the example shown, the elements corresponding to the left two columns of sub-matrix 1301 are already loaded during the previous iteration when sub-matrix 1001 of FIG. 10 was prepared. In some embodiments, a data input unit, such as data input unit 103 of FIG. 1 and/or data input unit 200 of FIG. 2, prepares a new data input vector using data elements from a previous iteration and the data elements from the new vertical column. The data elements for the new data input vector may be selected using a multiplexer or another appropriate technique. In some embodiments, the data elements of the new vertical column are loaded into a set of corresponding data input vector registers such as one of data input vector registers 201, 203, 205, 207, or 209 of FIG. 2.

Figure 14:
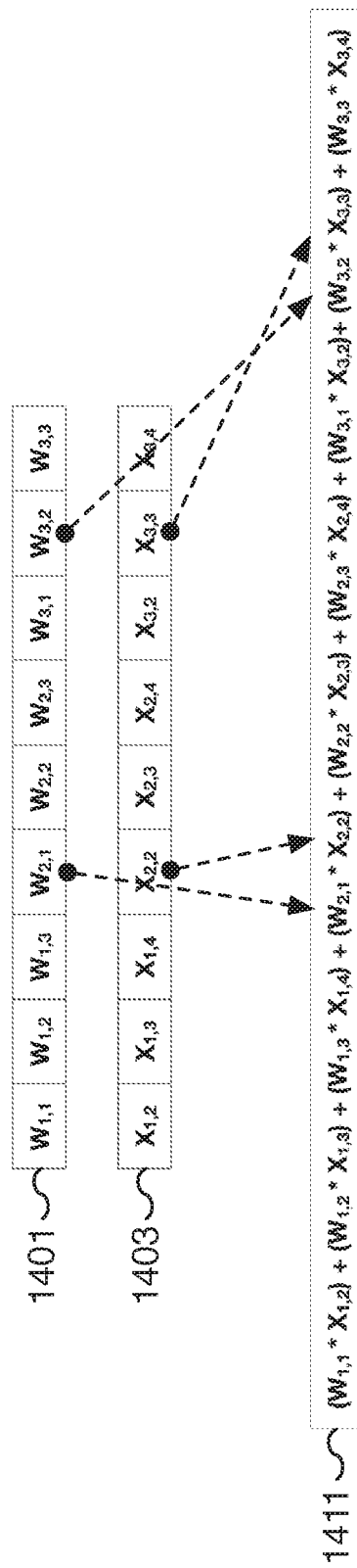
FIG. 14 is a diagram illustrating an example of vector computations for performing a channel convolution operation when an activation data input matrix is traversed horizontally.

FIG. 14 is a diagram illustrating an example of vector computations for performing a channel convolution operation when an activation data input matrix is traversed horizontally. FIG. 14 includes weight input vector 1401 and data input vector 1403. Weight input vector 1401 and data input vector 1403 each include nine data elements corresponding to a 3×3 matrix. In some embodiments, weight input vector 1401 corresponds to a linearized version of weight matrix 901 of FIG. 9 and data input vector 1403 corresponds to a linearized version of sub-matrix 1301 of FIG. 13. As described in more detail above, sub-matrix 1301 of FIG. 13 is a sub-matrix processed after traversing the assigned portion of an activation data input matrix horizontally. Both newly loaded and reused data elements of sub-matrix 1301 of FIG. 13 are reflected in data input vector 1403. Since the data elements of the activation data input matrix for sub-matrix 1301 of FIG. 13 share the same channel as the sub-matrix of the previous iteration, weight input vector 1401 is unchanged from the previous iteration and matches weight input vector 1101 of FIG. 11.

In some embodiments, cell 1411 illustrates the equivalent vector computations performed by a vector unit of a channel convolution processor unit on input vectors of weight input vector 1401 and data input vector 1403. The vector computation result shown in cell 1411 is the result determined by multiplying each element of weight input vector 1401 against a corresponding element of data input vector 1403. The nine elements from weight input vector 1101 are multiplied against the nine elements of data input vector 1403 to determine nine multiplication results. In the example shown, cell 1411 includes the nine multiplication terms corresponding to the nine multiplication results. The arrows in FIG. 14 call out two of the nine multiplication results and their corresponding operands as examples. The arrows show that weight element $W_{2,1}$ is multiplied with corresponding data element $X_{2,2}$ to determine a multiplication result ($W_{2,1}*X_{2,2}$) and that weight element $W_{3,2}$ is multiplied with corresponding data element $X_{3,3}$ to determine a multiplication result ($W_{3,2}*X_{3,3}$).

In some embodiments, the multiplication shown in cell 1411 is performed using a vector multiply unit such as vector multiply unit 403, 413, 423, or 453 of FIG. 4. In some embodiments, the multiplication results are fed as a vector into a vector adder unit to compute the sum of the multiplication results. The vector sum may be performed using a vector adder unit such as vector adder unit 405, 415, 425, or 455 of FIG. 4. In the example shown, the result of the vector operations performed is a single result sum and a channel convolution result data element of a channel convolution result matrix. In some embodiments, the result sum is a dot product computed using weight input vector 1401 and data input vector 1403. The result sum may be outputted as one element of a vector result and transmitted to an output unit such as output unit 151 of FIG. 1. In some embodiments, the equivalent of the vector computation result shown in cell 1411 is performed using channel convolution processor unit 107 of FIG. 1 and/or the processes of FIGS. 5 and/or 6. In some embodiments, the vector computations are performed at 507 of FIG. 5 and/or 605 of FIG. 6.

Figure 15:
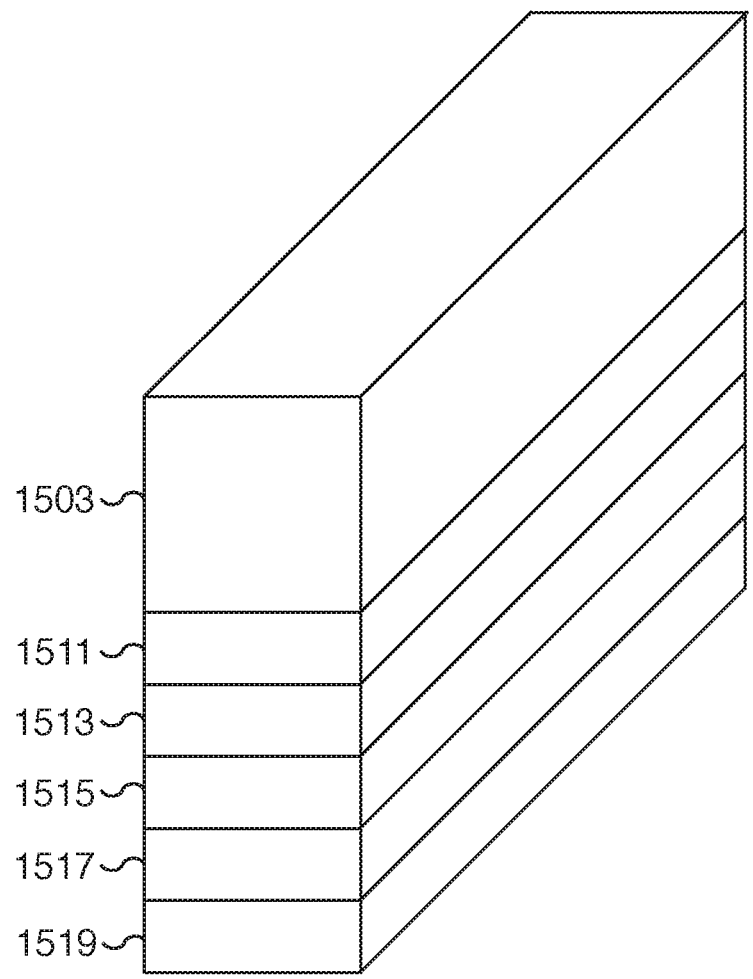
FIG. 15 is a diagram illustrating an example vertical traversal of an activation data input matrix for performing a convolution operation.

FIG. 15 is a diagram illustrating an example vertical traversal of an activation data input matrix for performing a convolution operation. In the example shown, three-dimensional sub-matrix 1503 is a portion of an activation data input matrix assigned to a processing element. Sub-matrix 1503 corresponds to the initial set of data input processed by a channel convolution processor unit. In some embodiments, sub-matrix 1503 is prepared and loaded to a channel convolution processor unit at step 601 of FIG. 6. Once the channel convolution result data elements associated with sub-matrix 1503 have been determined, additional portions of the activation data input matrix are processed by loading incremental data input. In the example of FIG. 15, the incremental data input is processed by traversing the activation data input matrix vertically. Horizontal rows 1511, 1513, 1515, 1517, and 1519 are incremental data input processed for each successive iteration (or cycle) in the process of determining channel convolution results and correspond to horizontal slices of the activation data input matrix. In various embodiments, the process used to determine channel convolution results is the process of FIGS. 5 and/or 6. For example, each of horizontal rows 1511, 1513, 1515, 1517, and 1519 is loaded during a different iteration at step 611 of FIG. 6. Additional horizontal rows are loaded and processed until there is no additional data input of the assigned portion of the activation data input matrix to the processing element. In some embodiments, the width and height of sub-matrix 1503 is 3×3 and the corresponding width and height of each horizontal row 1511, 1513, 1515, 1517, and 1519 is 3×1. Sub-matrix 1503 and horizontal rows 1511, 1513, 1515, 1517, and 1519 have the same depth in the channel dimension, which may be a cache-line or multiple of a cache-line. In some embodiments, sub-matrix 1503 is an initial sub-matrix of an activation data input matrix such as sub-matrix 703 of FIG. 7.

In the example shown, the activation data input matrix is traversed vertically and downward although the upward direction is possible as well. When traversing downward, each newly loaded horizontal row, such as horizontal row 1511, 1513, 1515, 1517, and 1519, replaces as input data the top-most row of the previous sub-matrix. For example, horizontal row 1511 replaces the top-most row of data elements of sub-matrix 1503. The result of loading each new horizontal row to replace the top-most row is to slide the relevant sub-matrix vertically to iteratively process the entire assigned portion of the activation data input matrix. In some embodiments, an example of a sub-matrix prepared using incremental data input is sub-matrix 705 of FIG. 7.

Figure 16:
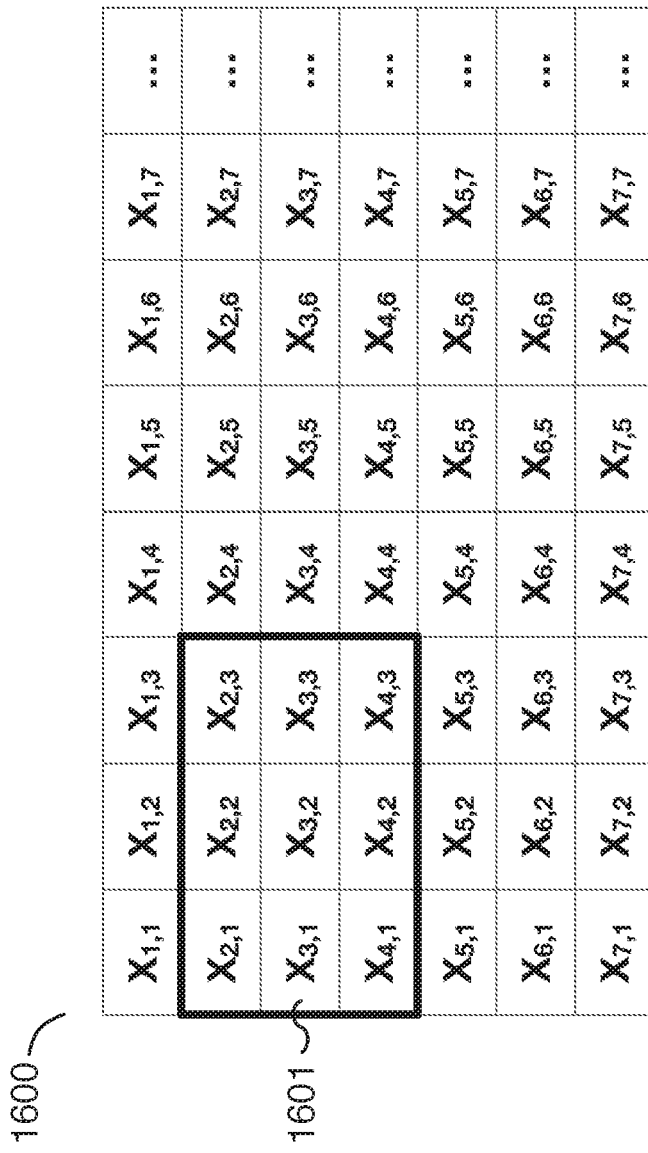
FIG. 16 is a diagram illustrating a single channel of an example activation data input matrix traversed vertically for performing a channel convolution operation.

FIG. 16 is a diagram illustrating a single channel of an example activation data input matrix traversed vertically for performing a channel convolution operation. Activation data input matrix 1600 is activation data input matrix 1000 of FIG. 10 and sub-matrix 1601 is a new sub-matrix for processing channel convolution results after channel convolution results are determined for sub-matrix 1001 of FIG. 10. In some embodiments, sub-matrix 1001 of FIG. 10 is processed during the previous iteration or cycle prior to processing sub-matrix 1601. For example, sub-matrix 1001 of FIG. 10 is prepared at step 601 of FIG. 6 and sub-matrix 1601 is prepared at step 611 of FIG. 6. Sub-matrix 1601 is prepared in part by loading a new horizontal row of data elements corresponding to the data elements $X_{4,1}$, $X_{4,2}$, and $X_{4,3}$. The new data elements replace the top-most row of the previous sub-matrix corresponding to data elements $X_{1,1}$, $X_{1,2}$, and $X_{1,3}$. In some embodiments, the new horizontal row is a horizontal row such as 1511 of FIG. 15.

In various embodiments, sub-matrix 1601 is processed with the same weight matrix as the sub-matrix processed during the previous iteration. To prepare the corresponding data elements of sub-matrix 1601 to be loaded to a vector unit of a channel convolution processor unit, only the new horizontal row of data elements needs to be loaded. For example, only memory reads for the data elements of the new row need to be issued and performed since the data elements from the remaining rows can be reused from previously performed memory reads. In the example shown, the elements corresponding to the top two rows of sub-matrix 1601 are already loaded during the previous iteration when sub-matrix 1001 of FIG. 10 was prepared. In some embodiments, a data input unit, such as data input unit 103 of FIG. 1 and/or data input unit 200 of FIG. 2, prepares a new data input vector using data elements from a previous iteration and the data elements from the new horizontal row. The data elements for the new data input vector may be selected using a multiplexer or another appropriate technique. In some embodiments, the data elements of the new horizontal row are loaded into a set of corresponding data input vector registers such as one of data input vector registers 201, 203, 205, 207, or 209 of FIG. 2.

Figure 17:
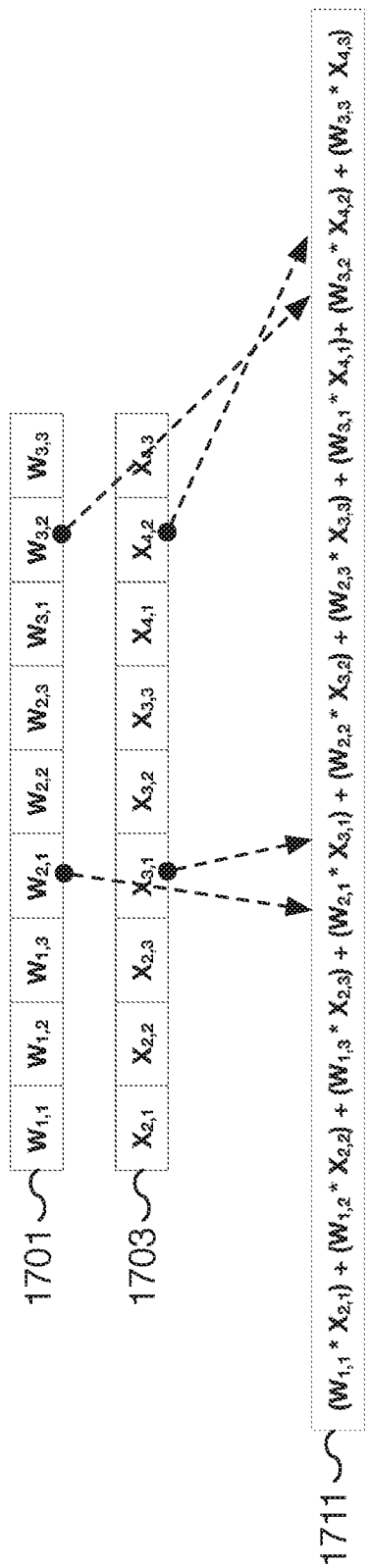
FIG. 17 is a diagram illustrating an example of vector computations for performing a channel convolution operation when an activation data input matrix is traversed vertically.

FIG. 17 is a diagram illustrating an example of vector computations for performing a channel convolution operation when an activation data input matrix is traversed vertically. FIG. 17 includes weight input vector 1701 and data input vector 1703. Weight input vector 1701 and data input vector 1703 each include nine data elements corresponding to a 3×3 matrix. In some embodiments, weight input vector 1701 corresponds to a linearized version of weight matrix 901 of FIG. 9 and data input vector 1703 corresponds to a linearized version of sub-matrix 1601 of FIG. 16. As described in more detail above, sub-matrix 1601 of FIG. 16 is a sub-matrix processed after traversing the assigned portion of an activation data input matrix vertically. Both newly loaded and reused data elements of sub-matrix 1601 of FIG. 16 are reflected in data input vector 1703. Since the data elements of the activation data input matrix for sub-matrix 1601 of FIG. 16 share the same channel as the sub-matrix of the previous iteration, weight input vector 1701 is unchanged from the previous iteration and matches weight input vector 1101 of FIG. 11.

In some embodiments, cell 1711 illustrates the equivalent vector computations performed by a vector unit of a channel convolution processor unit on input vectors of weight input vector 1701 and data input vector 1703. The vector computation result shown in cell 1711 is the result determined by multiplying each element of weight input vector 1701 against a corresponding element of data input vector 1703. The nine elements from weight input vector 1101 are multiplied against the nine elements of data input vector 1703 to determine nine multiplication results. In the example shown, cell 1711 includes the nine multiplication terms corresponding to the nine multiplication results. The arrows in FIG. 17 call out two of the nine multiplication results and their corresponding operands as examples. The arrows show that weight element $W_{2,1}$ is multiplied with corresponding data element $X_{3,1}$ to determine a multiplication result ($W_{2,1}*X_{3,1}$) and that weight element $W_{3,2}$ is multiplied with corresponding data element $X_{4,2}$ to determine a multiplication result ($W_{3,2}*X_{4,2}$).

In some embodiments, the multiplication shown in cell 1711 is performed using a vector multiply unit such as vector multiply unit 403, 413, 423, or 453 of FIG. 4. In some embodiments, the multiplication results are fed as a vector into a vector adder unit to compute the sum of the multiplication results. The vector sum may be performed using a vector adder unit such as vector adder unit 405, 415, 425, or 455 of FIG. 4. In the example shown, the result of the vector operations performed is a single result sum and a channel convolution result data element of a channel convolution result matrix. In some embodiments, the result sum is a dot product computed using weight input vector 1701 and data input vector 1703. The result sum may be outputted as one element of a vector result and transmitted to an output unit such as output unit 151 of FIG. 1. In some embodiments, the equivalent of the vector computation result shown in cell 1711 is performed using channel convolution processor unit 107 of FIG. 1 and/or the processes of FIGS. 5 and/or 6. In some embodiments, the vector computations are performed at 507 of FIG. 5 and/or 605 of FIG. 6.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A processor system, comprising:
a first group of registers configured to store data elements of a plurality of channels of a portion of a convolution data matrix, wherein each register of the first group of registers stores at least one data element from each of the plurality of channels;
a second group of registers configured to store data elements of a plurality of convolution weight matrices including a separate convolution weight matrix for each of the plurality of channels, wherein each register of the second group of registers stores at least one data element from each of the plurality of convolution weight matrices; and
a hardware channel convolution processor unit configured to:
for each data element in the first group of registers, multiply the data element in the first group of registers with a corresponding data element in the second group of registers to determine a corresponding multiplication result in multiplication results; and
for each specific channel of the plurality of channels, sum together ones of the multiplication results corresponding to the specific channel to determine at least one corresponding channel convolution result data element in a corresponding channel convolution result matrix;
wherein the first group of registers is configured to retain data elements of the portion of the convolution data matrix across the plurality of channels from a first convolution processing iteration that overlap with data elements of a different portion of the convolution data matrix across the plurality of channels for a second convolution processing iteration.

2. The system of claim 1, wherein a total count of the stored data elements of the first group of registers is the same as a total count of the stored data elements of the second group of registers.

3. The system of claim 1, wherein the hardware channel convolution processor unit comprises a plurality of calculation units and each calculation unit of the plurality of calculation units is configured to receive a plurality of data elements of the first group of registers corresponding to a same channel of the convolution data matrix and a plurality of corresponding data elements of the second group of registers corresponding to the separate convolution weight matrix for the same channel of the convolution data matrix.

4. The system of claim 3, wherein each calculation unit of the plurality of calculation units includes a different vector multiply unit and a different vector adder unit.

5. The system of claim 4, wherein each of the different vector adder units includes a different adder tree.

6. The system of claim 1, wherein the convolution data matrix is a three-dimensional machine learning data matrix.

7. The system of claim 1, further comprising a data input unit configured to: process the data elements stored in the first group of registers by channel into a plurality of data input vectors, wherein each of the plurality of data input vectors includes data elements corresponding to a two-dimensional sub-matrix of the convolution data matrix.

8. The system of claim 1, further comprising a weight input unit configured to: process the data elements stored in the second group of registers into a plurality of weight input vectors, wherein each of the plurality of weight input vectors includes data elements corresponding to one of the plurality of convolution weight matrices.

9. The system of claim 1, wherein each of the plurality of convolution weight matrices is a 3×3, 5×5, 7×7, 9×9, or 11×11 matrix.

10. The system of claim 1, wherein the data elements stored in the first group of registers are 4-bit, 8-bit, 2-byte, or 4-byte elements.

11. The system of claim 1, wherein a total count of the stored data elements of each of the first group of registers is a multiple of a cache line size.

12. A method, comprising:
receiving a convolution operation instruction specifying a convolution data matrix and a set of convolution weight matrices;
assigning a different portion of the convolution data matrix to each of a plurality of processing elements;
transmitting a plurality of data elements corresponding to the different assigned portion of the convolution data matrix to each of the plurality of processing elements;
broadcasting to each of the plurality of processing elements assigned a same channel of the convolution data matrix a same subset of the set of convolution weight matrices;
receiving from the plurality of processing elements channel convolution result data elements of a channel convolution result matrix determined using hardware channel convolution processor units of the plurality of processing elements; and
storing the channel convolution result matrix to a memory location;
wherein at least one of the plurality of processing elements stores in a first group of registers data elements of a plurality of channels of a portion of the convolution data matrix, wherein each register of the first group of registers stores at least one data element from each of the plurality of channels, and the first group of registers is configured to retain data elements of the portion of the convolution data matrix across the plurality of channels from a first convolution processing iteration that overlap with data elements of a different portion of the convolution data matrix across the plurality of channels for a second convolution processing iteration.

13. The method of claim 12, wherein the convolution data matrix and the channel convolution result matrix are stored using a channel-first layout format.

14. The method of claim 12, wherein the convolution data matrix is a three-dimensional machine learning data matrix and each of the set of convolution weight matrices is a two-dimensional matrix.

15. The method of claim 12, wherein the at least one of the plurality of processing elements:
stores in a second group of registers data elements of a subset of the set of convolution weight matrices including a separate convolution weight matrix for each of the plurality of channels, wherein each register of the second group of registers stores at least one data element from each of the subset of the set of convolution weight matrices.

16. The method of claim 15, wherein the at least one of the hardware channel convolution processor units of the plurality of processing elements:
- for each data element in the first group of registers, multiplies the data element in the first group of registers with a corresponding data element in the second group of registers to determine a corresponding multiplication result in multiplication results; and
- for each specific channel of the plurality of channels, sums together ones of the multiplication results corresponding to the specific channel to determine one corresponding channel convolution result data element in the corresponding channel convolution result matrix.

17. The method of claim 16, wherein the at least one of the hardware channel convolution processor units of the plurality of processing elements comprises a plurality of calculation units and each calculation unit receives a plurality of data elements of the first group of registers corresponding to a same channel of the convolution data matrix and a plurality of corresponding data elements of the second group of registers corresponding to the separate convolution weight matrix for the same channel of the convolution data matrix.

18. A method, comprising:
- storing at a hardware processing element in a first group of registers data elements of a plurality of channels of a first portion of a convolution data matrix, wherein each register of the first group of registers stores at least one data element from each of the plurality of channels;
- storing at the hardware processing element in a second group of registers data elements of a subset of a set of convolution weight matrices including a separate convolution weight matrix for each of the plurality of channels, wherein each register of the second group of registers stores at least one data element from each of the subset of the set of convolution weight matrices;
- for each data element in the first group of registers, multiplying the data element in the first group of registers with a corresponding data element in the second group of registers to determine a corresponding multiplication result in multiplication results;
- for each specific channel of the plurality of channels, summing together ones of the multiplication results corresponding to the specific channel to determine at least one corresponding channel convolution result data element in a corresponding channel convolution result matrix;
- saving in the first group of registers data elements that overlap between the first portion of the convolution data matrix and a second portion of the convolution data matrix; and
- storing in the first group of registers a three-dimensional slice of data elements of a plurality of channels of the second portion of the convolution data matrix, wherein the data elements of the three-dimensional slice are different from the data elements of the first portion of the convolution data matrix.

19. The method of claim 18, wherein the three-dimensional slice of data elements is a vertical column or a horizontal row of the second portion of the convolution data matrix.

20. The method of claim 18, wherein a total count of the stored data elements of each of the first group of registers is a multiple of a cache line size, and wherein the total count of the stored data elements of the first group of registers is the same as a total count of the stored data elements of the second group of registers.

* * * * *